(12) United States Patent
Adams et al.

(10) Patent No.: US 6,873,341 B1
(45) Date of Patent: Mar. 29, 2005

(54) DETECTION OF VIDEO WINDOWS AND GRAPHICS WINDOWS

(75) Inventors: Dale R. Adams, San Jose, CA (US); Michael R. Mruzik, Mountain View, CA (US); Stephen J. Keating, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 121 days.

(21) Appl. No.: 10/287,976

(22) Filed: Nov. 4, 2002

(51) Int. Cl.⁷ ................................................. G09G 5/00
(52) U.S. Cl. ....................... 345/629; 345/632; 345/790
(58) Field of Search ............................... 345/629, 630, 345/632, 633, 634, 790

(56) References Cited

U.S. PATENT DOCUMENTS

| | | | |
|---|---|---|---|
| 5,557,724 A | 9/1996 | Sampat et al. | 395/157 |
| 5,577,186 A | 11/1996 | Mann, II et al. | 395/806 |
| 5,608,864 A | 3/1997 | Bindlish et al. | 395/507 |
| 5,768,491 A | 6/1998 | Lobodzinski et al. | 395/134 |
| 5,774,664 A | 6/1998 | Hidary et al. | 395/200.48 |
| 5,777,631 A | 7/1998 | Greene et al. | 345/509 |
| 5,778,181 A | 7/1998 | Hidary et al. | 395/200.48 |
| 5,781,182 A | 7/1998 | Liu et al. | 345/196 |
| 5,791,907 A | 8/1998 | Ramshaw et al. | 434/262 |
| 5,896,140 A | 4/1999 | O'Sullivan | 345/508 |
| 5,926,187 A | 7/1999 | Kim | 345/435 |
| 6,006,241 A | 12/1999 | Purnaveja et al. | 707/512 |
| 6,018,768 A | 1/2000 | Ullman et al. | 709/218 |
| 6,069,669 A | 5/2000 | Park et al. | 348/596 |
| 6,173,317 B1 | 1/2001 | Chaddha et al. | 709/219 |
| 6,230,172 B1 | 5/2001 | Purnaveja et al. | 707/512 |
| 6,330,595 B1 | 12/2001 | Ullman et al. | 709/219 |
| 2002/0145611 A1 * | 10/2002 | Dye et al | 345/543 |

* cited by examiner

*Primary Examiner*—Matthew Luu
(74) *Attorney, Agent, or Firm*—Morrison & Foerster LLP

(57) ABSTRACT

The invention relates to computer graphics and computer imaging on a video display, and includes the dynamic detection of video windows and graphical images overlapping one another. A display processor identifies differences between typical video and graphics data sources to detect the edges of video windows. By detecting the edges of active video windows within a graphics image, a display processor may uniquely adjust image characteristics of an exposed video window. These characteristics include, for example, hue, brightness, intensity and contrast.

30 Claims, 22 Drawing Sheets

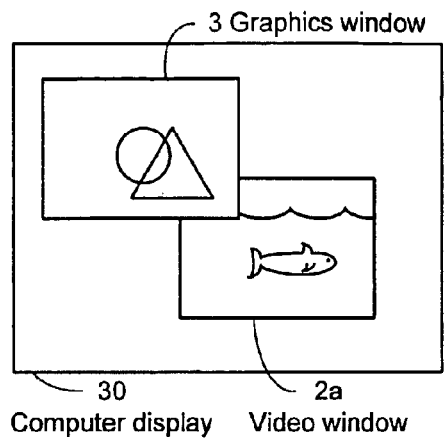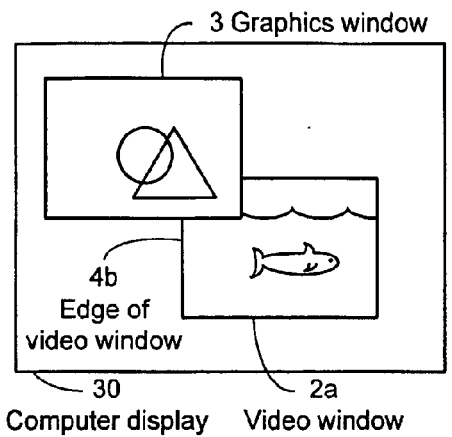
FIGURE 1A
(Prior Art)
FIGURE 1B
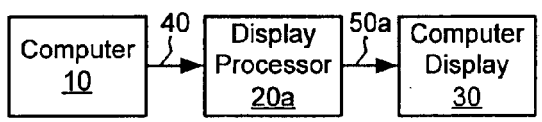
FIGURE 2A
(Prior Art)
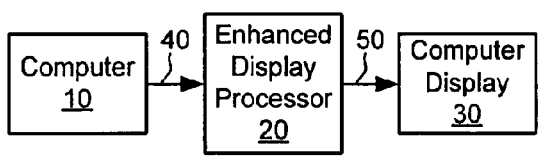
FIGURE 2B
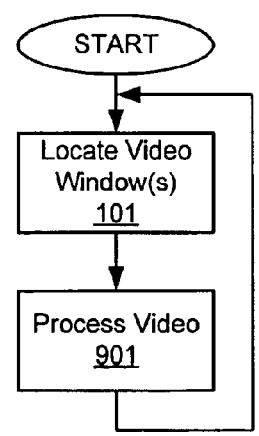
FIGURE 3

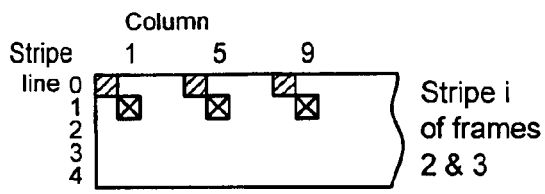
FIGURE 14B
FIGURE 14C
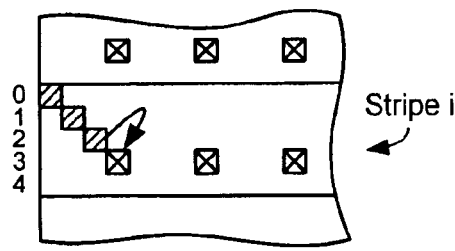
FIGURE 14D
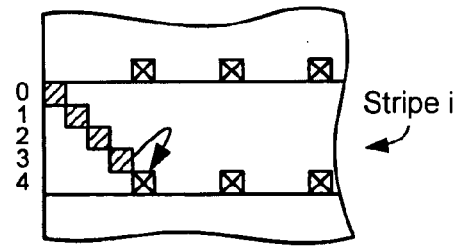
FIGURE 14E
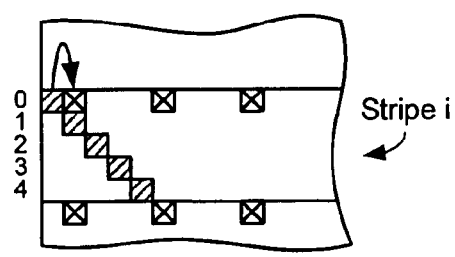
FIGURE 14F
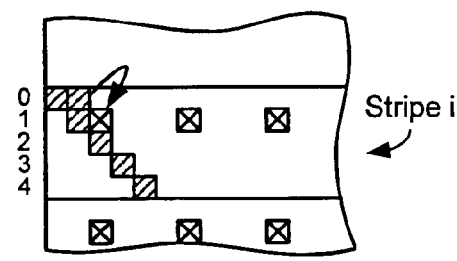
FIGURE 14G
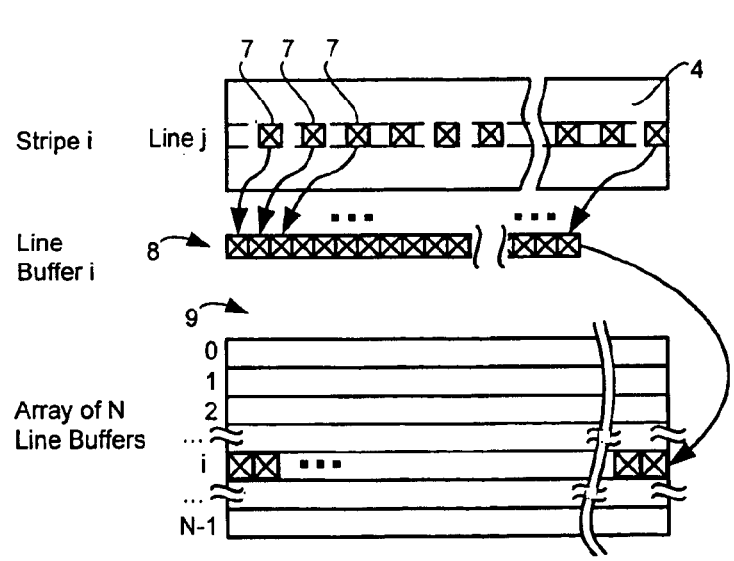
FIGURE 15

DETECTION OF VIDEO WINDOWS AND GRAPHICS WINDOWS

BACKGROUND OF THE INVENTION

1. Field of the Invention

The invention relates to simultaneous rendering of graphics and video on an image display device, and more particularly includes the detection of video windows, which may be partially hidden by graphics windows.

2. Discussion of Related Art

Multimedia computer systems and televisions typically include a display device, such as a cathode ray tube display (CRT) or liquid crystal display (LCD), plasma display or digital light display upon which information is presented to operators and viewers. The displayed information may be one or a combination of various images, including video, animation, photographs and text. The various images are often displayed in separate windows; and these windows often overlap such that one image is partially or fully covering another window.

FIG. 1A illustrates a computer display presenting graphic-like objects in combination with video-like objects. The Figure shows a computer display 30 including both a video window 2a and a graphics window 3. The video window 2a may contain animation or moving images, for example of a fish swimming in the ocean. The graphics window 3 may contain, for example, computer generated shapes, or text, which may be scrolling. In the illustration shown, the video window 2a partially covers the graphics window 3, resulting in a rectangular video window 2a.

Typically, data presented on computer display 30 may be characterized as either graphics or video. In general, graphic-like objects are displayed in graphics windows 3, and video-type objects are displayed in video windows 2a. Often these displays appear as a collage of windows.

FIG. 1B illustrates a computer display presenting a second combination of graphic-like objects and video-type objects. The Figure shows a computer display 30 including both a rectangular video window 2a and a rectangular graphics window 3. Unlike, FIG. 1A, this illustration shows the graphics window 3 partially covering the video window 2a. The uncovered portion of the partially covered video window 2a forms a six-sided polygon 4b, with parallel sides and one concave corner.

FIG. 2A illustrates, in a block diagram, a computer system including a computer, a display processor and a computer display. The computer system includes a computer 10 that communicates to a display processor 20a by way of a first interface 40. The first interface 40 carries an input stream of pixel data. The display processor 20a, in turn, communicates to the computer display 30 by way of a second interface 50a. The second interface 50a carries an output stream of pixel data.

The input and output streams of pixel data are encoded in a manner that can be decoded by the display processor 20a and computer display 30. The display processor 20a receives display pixel data from the computer 10, modifies the pixel data so that an enhanced image may be displayed as well as possibly reformatting the pixel data so that it may be transmitted (e.g. in DVI, HDMI or IEEE 1394 standard formats), and then forwards the modified and possibly reformatted data to the computer display 30 for display thereon.

The streams of pixel data on interfaces 40 and 50a may be digital or analog signals. Each stream of pixel data is segmented into a sequence of frames, with each frame including a plurality of bits. Each frame is segmented into a plurality of lines. Each row is segmented into a plurality of words or bytes. A word represents a picture element (pixel), which provides information on the brightness as well as the color characteristics for that pixel.

Each frame of data may contain one or more windows of information to display. The windows may include a combination of multiple graphics and video windows. As the information to be displayed changes, the data within subsequent frames will change.

The display processor 20a may be a system component, for example, the iScan Pro system or the iScan Plus V2, both manufactured by Silicon Image, Inc. of Sunnyvale, Calif. The display processor 20a may include a semiconductor integrated circuit, for example, the SiI 503, SiI 504 or SiI 861, also both manufactured by Silicon Image. The display processor 20a may be a separate unit (as shown); and can be incorporated in the computer 10, or incorporated in the computer display 30.

Some computer systems allow an operator to configure the display processor 20a to disable, or to enable, the enhancement of images presented on the computer display 30. Digital processing, used to enhance the graphics of prior art display processors 20a, may be unsuitable for video images. Likewise, the digital processing used to enhance video images may be unsuitable for graphics. If the operator disables enhancement, no portion of the computer display 30 is enhanced; and such display attributes as the brightness and contrast might be less than optimum for pleasurable viewing. If the operator enables enhancement, the entire computer display 30 is enhanced. If the operator enables enhancement and enhancement parameters are adapted to graphics, any video images may appear washed out, unnatural and lifeless. If the operator enables enhancement and enhancement parameters are set to those favoring video, the non-video images may appear over-colorized and too bright.

Alternatively, some prior art systems allow for enhancement of only a single rectangular region of the computer display 30. When these prior art systems are faced with overlapping windows resulting in non-rectangular video windows or multiple rectangular regions, only a single rectangular region is enhanced. When presented with the example shown in FIG. 1B, these systems either fail to enhance a portion of the video window 2b or erroneously enhance a portion of the graphics window 3. Similarly, when the prior art systems are faced with multiple video windows, only one video window is enhanced. Additionally, the prior art systems do not allow the operator to customize processing parameters used to enhance video images.

When the display processor 20a is faced with multiple video images, with a partially covered video image, or a completely covered video image, the resulting images in computer display 30 may appear unnatural to the viewer. Therefore, there is a desire to have an apparatus, system and method to better detect the boundaries of multiple video windows and partially covered video windows to allow for customized processing such that the images appear in more natural coloring.

SUMMARY

Embodiments of the present invention detect video windows within a stream of mixed non-video (e.g., graphics) and video data on a frame by frame basis comprising: sampling a first subset of pixels from a first frame; sampling a corresponding second subset of pixels from a second frame; comparing each of the first subset of pixels with a corresponding pixel from the second subset of pixels; sampling a third set of pixels from the second frame; comparing each of the first subset of pixels with a corresponding pixel from the second subset of pixels; comparing pixels within the second and third subsets of pixels with neighboring pixels in close spatial proximity; and determining whether a set of edges exist that define a detected video window. This process may be repeated with variation as subsequent frames are captured.

The present invention is better understood upon consideration of the accompanying drawings and the detailed description below.

BRIEF DESCRIPTION OF THE DRAWINGS

FIG. 1A illustrates a computer display presenting graphic-like objects in combination with video-type objects.

FIG. 1B illustrates a computer display presenting a second combination of graphic-like objects and video-type objects.

FIG. 2A illustrates, in a block diagram, a computer system including a computer, a display processor and a computer display.

FIG. 2B illustrates, in a block diagram, a computer system including a computer, an enhanced display processor and a computer display.

FIG. 3 shows two stages of processing in a display processor.

FIGS. 14A–14D illustrate an example of vertical decimation, horizontal decimation, and pixel traversing in accordance with the present invention.

FIG. 15 illustrates storing vertically and horizontally decimated data into a line buffer and into an array of line buffers in accordance with the present invention.

FIG. 22B and 22C plot auto correlation results for two different cases.

In the present disclosure, like objects that appear in more than one figure are provided with like reference numerals.

DETAILED DESCRIPTION

Figure 4A:
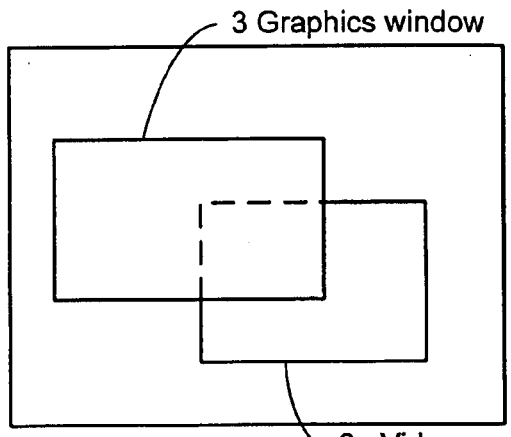
FIGS. 4A, 4B and 4C show graphically steps in processing video data.

As mentioned, images displayed on a computer-driven display are often presented as a series of separate frames. Each frame may include several rectangular and potentially overlapping windows of video and graphics images. The windows may overlap one another causing parts, or all, of windows to be hidden from view. For instance, when a graphics window partially covers a video window, the displayed video window might be non-rectangular or might be split into two rectangles. Additionally, an operator or a computer program may resize or move video windows and graphics windows on the computer display. Overlapping windows, and movement of windows by an operator, complicate efforts to enhance video windows for optimal viewing, since the confines of the video window are variable.

FIG. 2B illustrates, in a block diagram, a computer system including a computer 10, an enhanced display processor 20, and a computer display 30. The enhanced display processor 20, in accordance with the present invention, identifies stationary and non-stationary video windows, and identifies rectangularly and non-rectangularly shaped video windows.

The enhanced display processor 20, in accordance with some embodiments of the present invention, identifies irregularly shaped, split and moving video windows. Once the enhanced display processor 20 identifies the exposed area of a video window, it can apply video image processing techniques to separately enhance the video window. The original video pixel data in the video window of a frame received by the enhanced display processor 20 from the computer 10 on interface 40 is replaced with the enhanced video pixel data. The altered frame is then output from the display processor to the computer display 30 via interface 50. The viewer then can observe graphics images combined with the separately enhanced video images.

Figure 9A:
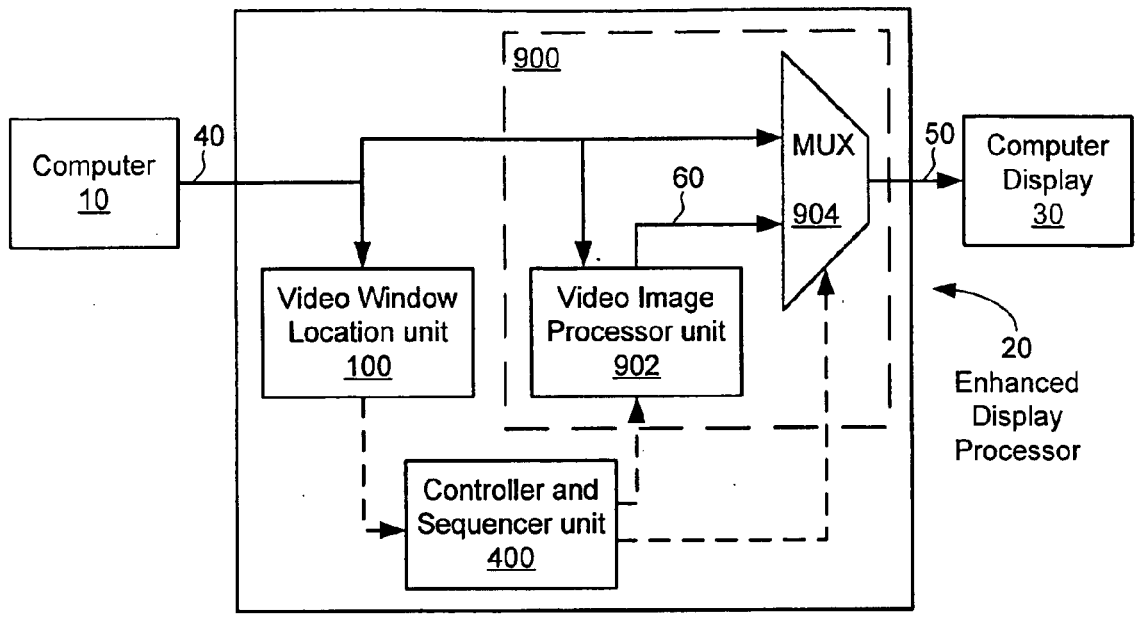
FIG. 9A is a block diagram of a computer system including a display processor in accordance with the present invention.

FIG. 3 shows two stages of a method of processing pixel data performed within the enhanced display processor 20 of FIG. 9A of the present invention. Enhanced display processor 20 performs a locate video window(s) function 101. The locate video window(s) function 101 samples pixel data received from the computer 10, distinguishes between video and graphics data, and detects whether one or more video windows exist within each frame. Subsequently, or in parallel, the enhanced display processor 20 performs a process video function 901. The process video function 901 enhances video pixel data identified by function 101.

Once the locate video window(s) function 101 samples pixel data and differentiates between video and graphics data, function 101 attempts to detect and define each video window send by computer 10. Each detected video window may be defined by its coverage area, boundaries (borders), or corners. If defining either a non-polygon or a polygon, defining a window by its coverage area can mean listing all pixel coordinates within the window that are identified as video pixels, such as a bit map. If defining a non-polygon, defining a window by boundaries can mean that a set of curves and edges are defined. If defining a polygon, defining a window by boundaries can mean that a set of straight edges (lines) are defined. A set of edges may be defined by begin and end points of each edge. Alternatively, defining a window by corners can mean that corner pixel locations are identified at two predetermined corners that are at diagonal corners of a rectangle. Additionally, a parameter may be used to determine whether the video lies inside or outside the defined boundaries. Alternatively, a parameter may be used to indicate whether the associated video lies on the right side or left side of a defined edge or whether the associated video lies on the inside or outside of the defined boundaries. Alternatively, the order of corner points could decide where the video lies. That is, if the top-left corner is defined before the bottom-right corner, then the video is within the defined area. If the top-left corner is defined after the bottom-right corner, then the video is outside the defined area.

The enhanced display processor 20 may also perform a process video function 901. The process video function 901 uses the results of the locate window(s) function 101, which as mentioned detects video pixels in the stream of pixel data. The process video function 901 modifies video pixel data within the detected video window to enhance the video window to be displayed on computer display 30.

Figure 4B:
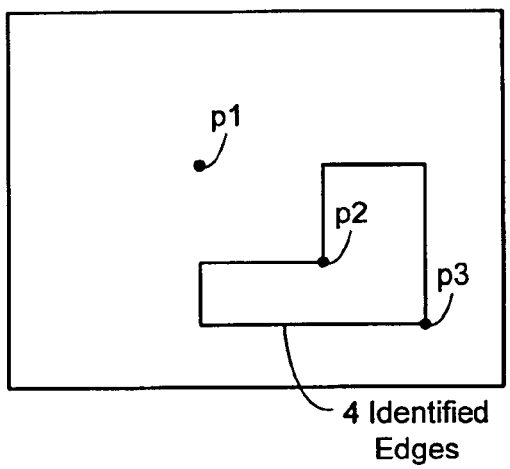
Figure 4C:
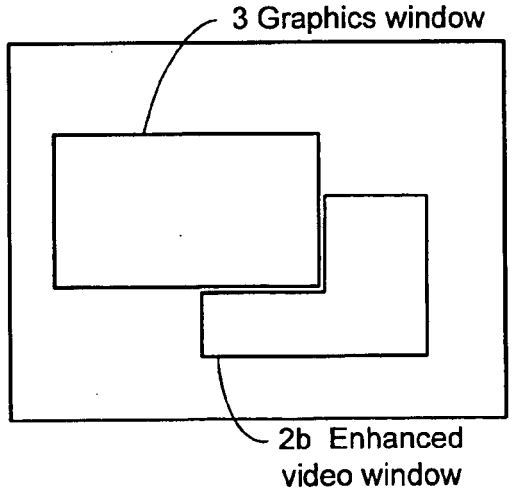
Figure 5A:
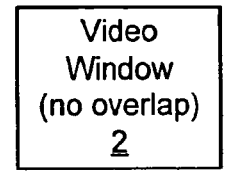
FIGS. 5(a)–(q) show different scenarios of a video window partially covered by a graphics window.
Figure 5B:
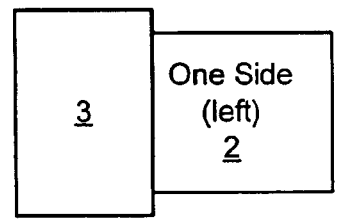
Figure 5C:
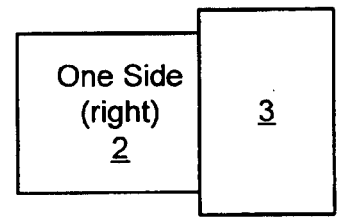
Figure 5D:
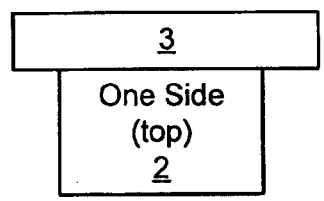
Figure 5E:
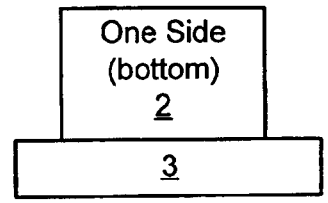
Figure 5F:
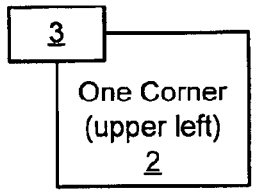
Figure 5K:
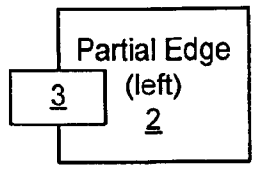
Figure 5P:
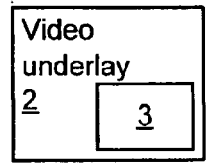
Figure 5G:
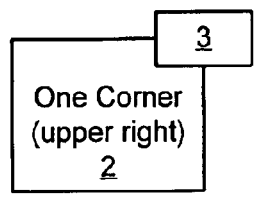
Figure 5L:
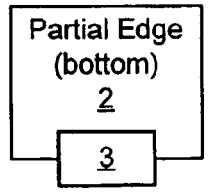
Figure 5Q:
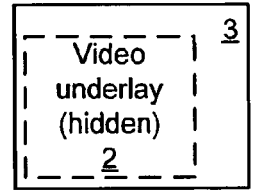
Figure 5H:
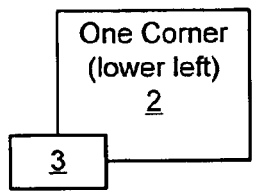
Figure 5M:
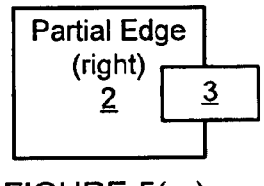
Figure 5I:
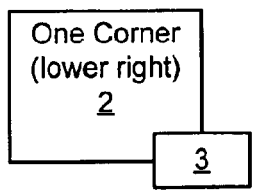
Figure 5N:
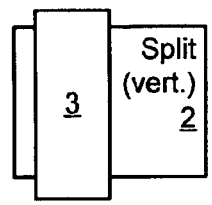
Figure 5J:
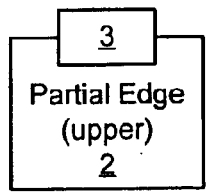
Figure 5N:
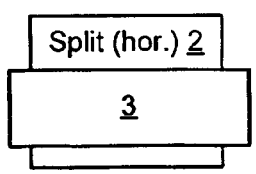
Figure 6A:
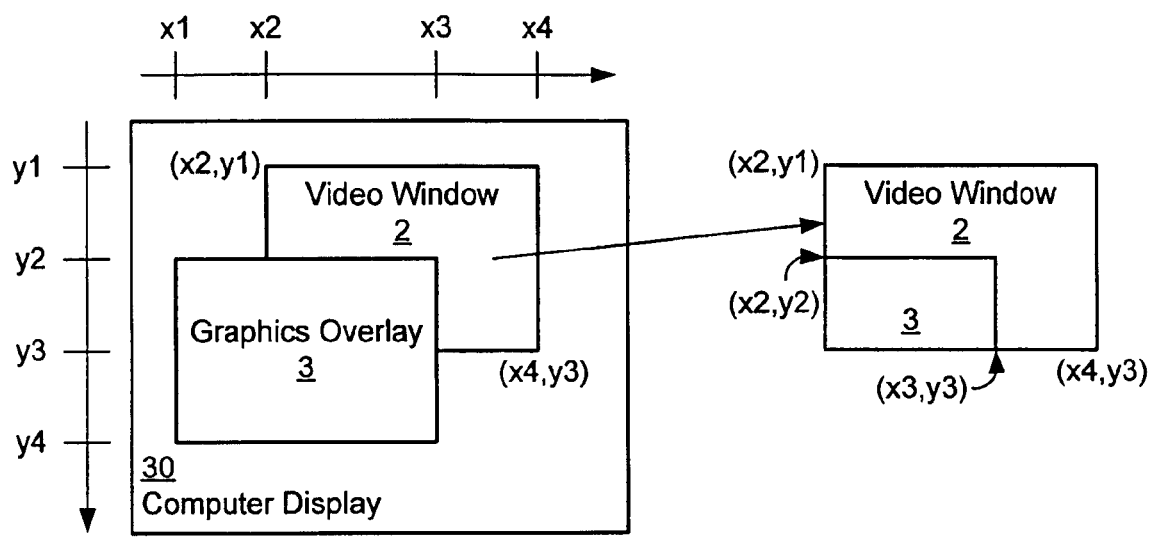
FIG. 6A shows an example of how to define a video window and a graphics overlay by two pairs of points.
Figure 6B:
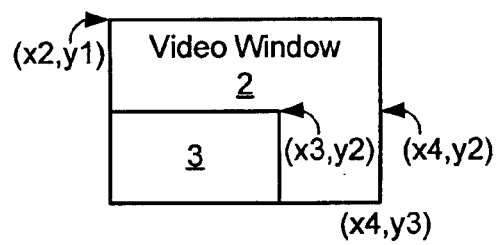
FIG. 6B shows another example of how to define a video window and a graphics overlay by two pairs of points.

FIGS. 4 through 6 show various combinations of a graphics window and a video window within a frame of data displayed to an operator. If a computer display 30 shows both a graphics window and a video window, the rectangular video window may be partially covered and blocked from view by the graphics window. FIGS. 4A through 4C illustrate a process to detect a non-rectangular video window. FIGS. 5(*a*) though 5(*q*) define each possible combination of overlapping graphics and video windows. FIGS. 6A and 6B show two ways to defined a non-rectangular video window. Each Figure is now explained in detail.

FIGS. 4A, 4B and 4C show graphically steps in processing video data as described above with reference to FIG. 3. FIG. 4A shows an example of a frame that includes a graphics window 3 and a video window 2*a*. A corner of an un-enhanced video window 2*a* is partially covered by a graphics window 3. FIG. 4B shows a result of the locate video window(s) function 101 of FIG. 3, whereby the edges 4 of the exposed portions of video window 2*a* are identified. The exposed video window may be defined by some simple method of enumerating the coordinates of all the pixels within the exposed video window, by the edges of the exposed video window, or by a set of corner points of the rectangle. For example, as shown in FIG. 4B, points p1 and p3 uniquely identify the video window 2*a* and points p1 and p2 define that portion of the video window 2*a* covered by the graphics window 3. The detected exposed portions of the video window 2*a* undergo processing to produce an enhanced video window 2*b*. FIG. 4C shows a frame with an enhanced video image in enhanced video window 2*b*. The exposed pixels from each frame that are within the identified edges 4 of the video window 2*a* are replaced with modified pixels pursuant to the process. The resultant sequence of video function 101 displayed on the computer display 30 of FIG. 4C includes an enhanced video image in each frame.

A display including one video window and one graphics window may result in a rectangular, a split or irregularly shaped, or a completely covered video window. The locate video window(s) function 101 should be capable of handling a full variety of window overlap scenarios.

FIGS. 5(*a*) thought 5(*q*) show different overlaps scenarios of a video window. FIG. 5(*a*) shows the case where a video window 2 is not obscured by a graphics window. FIGS. 5(*b*)–(*e*) show cases where an entire edge of a video window 2 is covered by a graphics window 3. FIGS. 5(*f*)–(*i*) show cases where only part of one of four edges of a video window 2 is covered. FIGS. 5(*j*)–(*m*) show cases where an edge between two corners is partially covered. FIGS. 5(*n*)–(*o*) show cases where a graphics window 3 splits a video window 2 into two rectangular pieces by covering opposite edges of the video window 2. FIG. 5(*p*) shows the case where all of the edges and corners of a video window 2 are visible; however, a graphics window 3 is superimposed over and within the boundaries of a video window 2. Finally, FIG. 5(*q*) shows the case where a video window 2 is completely covered by a graphics window 3.

FIG. 6A shows how a rectangular video window 2 and a rectangular graphics window 3 may be defined by two pairs of points. As previously discussed, the video window 2 can be defined by a first pair of points, for example, its corner points (x2, y1) and (x4, y3). A portion of a graphics window 3 that covers a video window 2 may also be defined by a second pair of points, for example, its two corner points (x2, y2) and (x3, y3).

Alternatively, as shown in FIG. 6B, the exposed video window 2 may be split into multiple rectangular regions. For example, the rectangular region defined by corner points (x2, y1) and (x4, y2) would define the position of a first portion of the video window; and the corner points (x3, y2) and (x4, y3) would define the position of a second portion of the video window. In this example, the exposed video window would consist of two uniquely defined non-overlapping rectangles. In addition, by breaking the area of an exposed video window into multiple rectangles, the process may be extended to identify and list the corner points of multiple irregularly shaped exposed video windows.

Before examining an enhanced method and apparatus to detect video windows in a stream of pixel data, consider the decomposition frames of data into bits of pixel data. Frames may be transmitted in either a non-interlaced format or an interlaced format.

Figure 7A:
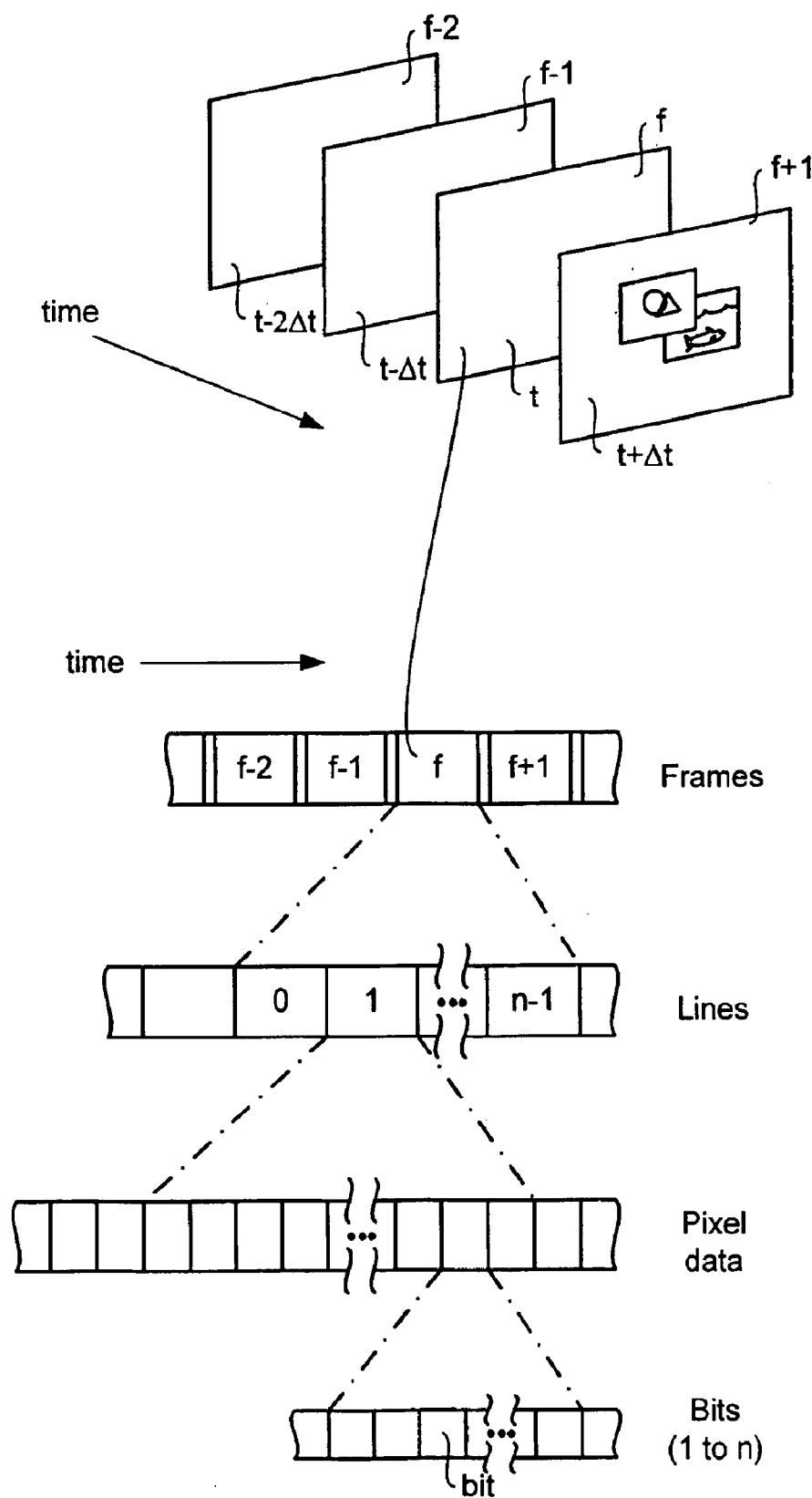
FIG. 7A illustrates the decomposition of a sequence of non-interlaced frames into a stream of pixel data.

FIG. 7A illustrates the decomposition of a sequence of non-interlaced frames into a stream of pixel data. The computer 10 of FIG. 2B sends an input stream of pixel data across interface 40. The image viewed by the operator is comprised of frames (e.g., f−2, f−1, f, f+1,) arriving sequentially (e.g., at times t−2Δt, t−Δt, t, t+Δt). Each frame in the sequence is comprised of a set of n rows numbered 0 through n−1, which consist of both active video lines and vertical blanking lines. The number n of active video lines in a frame is a well-known constant that may be different for each of the many different video formats or standards. A computer display configured, for example, for VGA (640×480) has 480 lines of active video and has 640 active pixels per row.

Depending on the format used, each pixel of information may be represented by a group of one or more bits, which typically are grouped into one or more bytes or words.

Figure 7B:
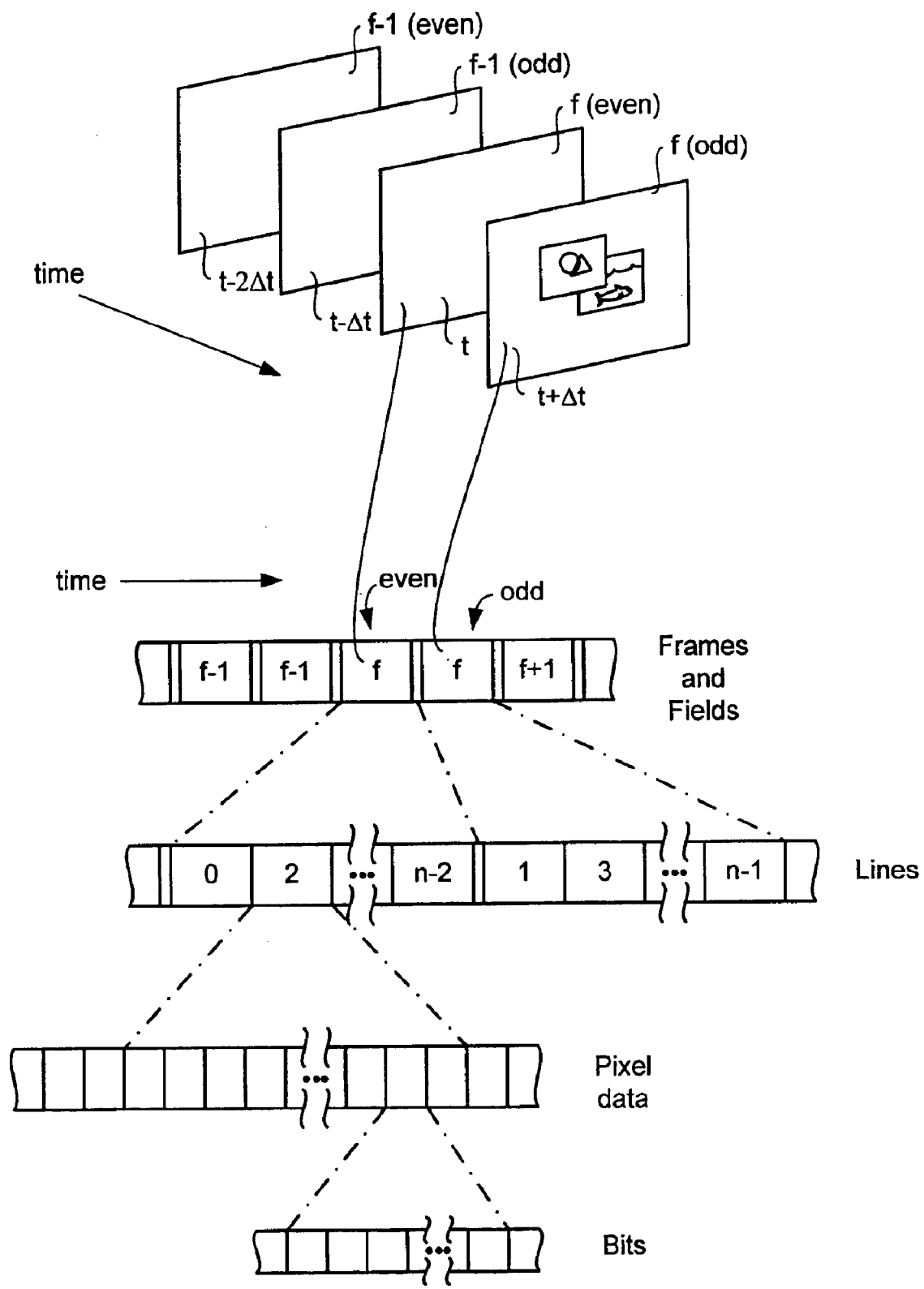
FIG. 7B illustrates the decomposition of a sequence of interlaced fields in progressive frames.

FIG. 7B illustrates the decomposition of a sequence of interlaced fields rather than the progressive frames which were shown in FIG. 7A. Interlaced fields each contain half of a full frame of data, however are transmitted at twice the rate of non-interlaced frames. The computer 10 sends an input stream of pixel data across interface 40. The image viewed by the operator is comprised of interlaced fields (e.g., f−2, f−1, f, f+1) arriving sequentially (e.g., at times t−2Δt, t−Δt, t, t+Δt). Each frame in the sequence is thus comprised of a pair of fields: an even field and an odd field. The even field of a frame is comprised of a set of even rows 0, 2, 4, etc. through n−2. The odd field of a frame is comprised of a set of odd rows 1, 3, 5, etc. through n−1. As with non-interlaced formats, each row of active video has a set number of active pixels and each pixel is represented one or more bits.

In some embodiments, by examining pixel data on a row by row basis aids in determining the boundaries of an exposed video window. Rows of pixel data are analyzed to determine whether a pixel should be characterized as a graphics pixel from a graphics window, or should be characterized as a motion pixel from a video window. Pixels determined to be graphics pixels are grouped together to form graphics line segments. Pixels determined to be motion pixels are grouped together to form moving line segments. Graphics line segments and moving line segments are compared to determine video line segments.

Figure 8:
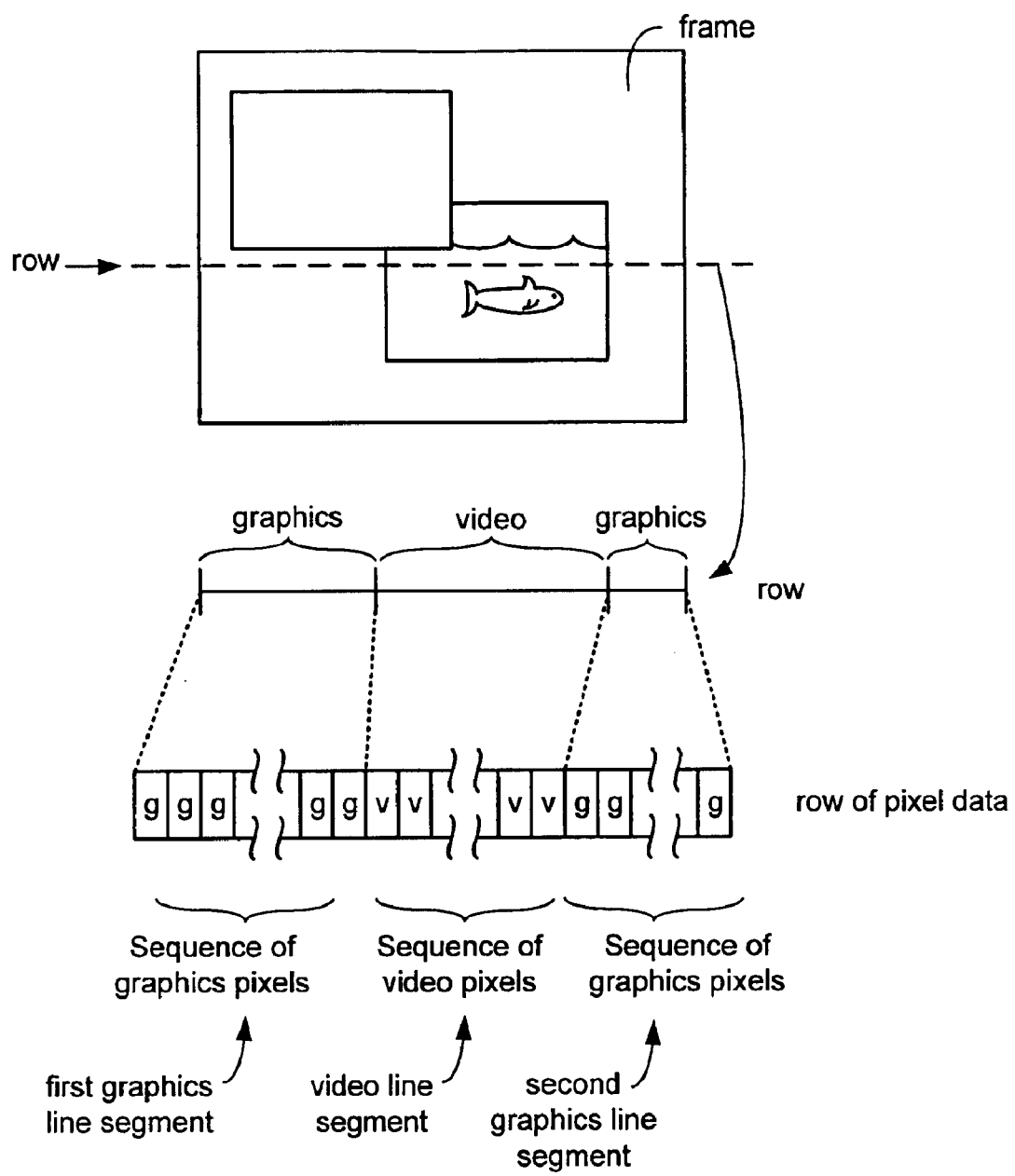
FIG. 8 illustrates a row of pixel data displayed in a frame of data on a computer display.

FIG. 8 illustrates a row of pixel data displayed in a non-interlaced or interlaced frame on a computer display. A row of pixel data from a frame might include a sequence of graphics data followed by video data followed again by graphics data. The first sequence of graphics pixels in the row of pixels defines a first graphics line segment. The sequence of video pixels defines a video line segment. The final sequence of graphics pixels defines a second graphics line segment. By observing over a series of frame the arrangement of video line segments, an enhanced display processor 20 can detect and define video windows such that the video windows substantially include the video line segments.

By determining a set of video line segments, an enhanced display processors 20 can set boundaries (borders) to indicate which pixels to enhance for proper video presentation. The video line segments may be compiled over time to produce a free-formed shape, or a polygon. The polygon may be a right-angled polygon such as one of the exposed video windows 2 shown in FIG. 5, or simply a polygon with straight edges and one or more non-right angled corners.

Figure 9B:
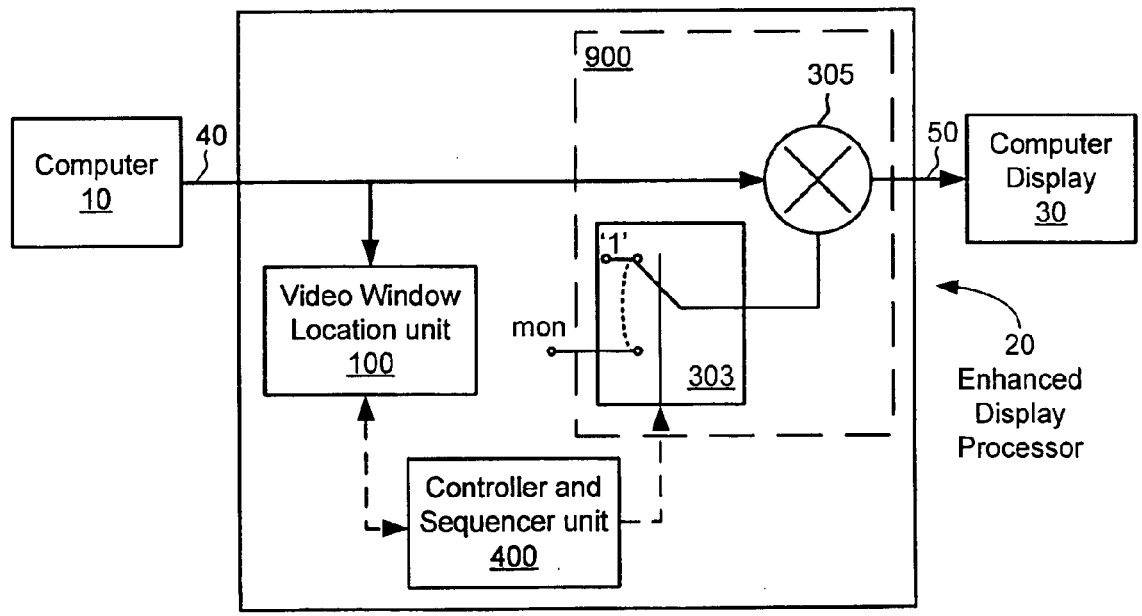
FIG. 9B is a block diagram of a second computer system including a display processor in accordance with the present invention.
Figure 10:
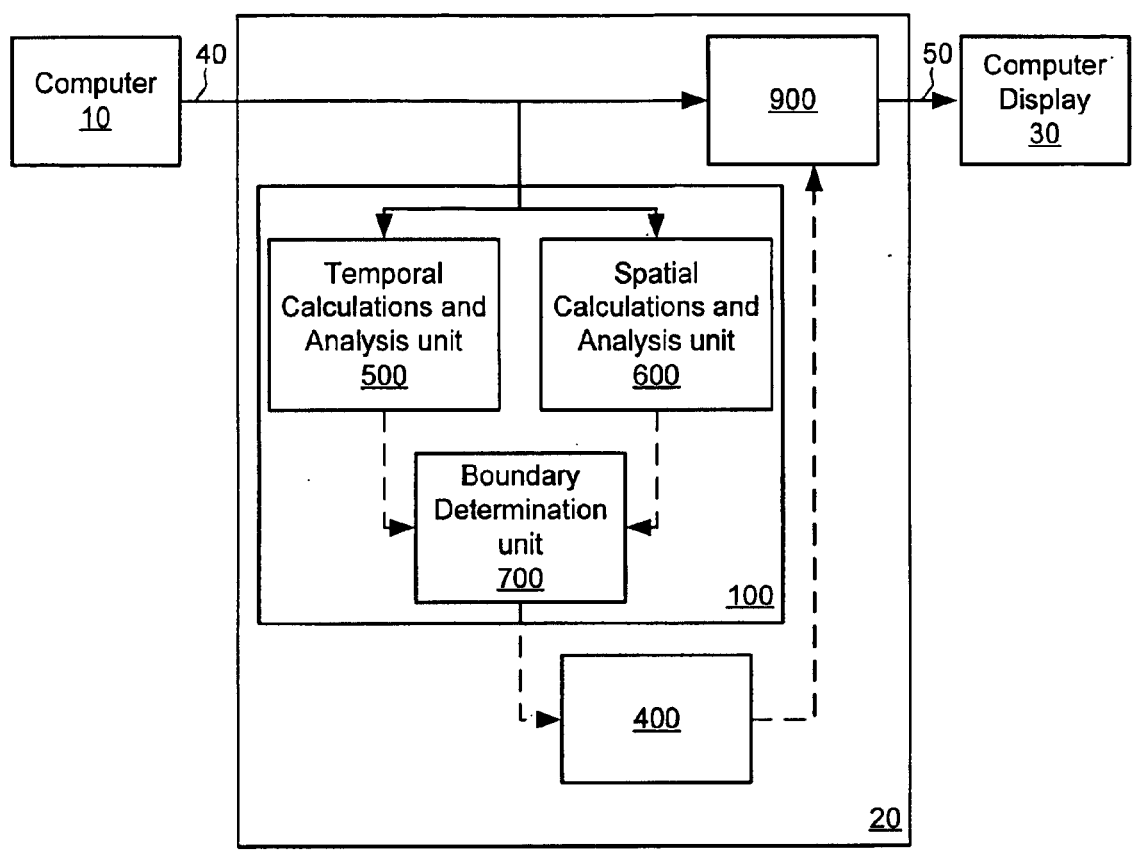
FIG. 10 illustrates information flow from a computer to modules within a video window locator according to some embodiments of the present invention.

Exemplary enhanced display processors 20 of the present invention are herein disclosed. The enhanced display processor 20 may be constructed in software, hardware or a combination of both hardware and software. FIGS. 9A, 9B and 10 show exemplary implementations of an enhanced display processor 20.

FIG. 9A is a block diagram of a computer system 1 including an enhanced display processor 20 in accordance with the present invention. FIG. 9A includes a computer 10, an enhanced display processor 20 and a computer display 30. The enhanced display processor 20 includes a video window locator unit 100, a controller and sequencer unit 400 and a video image processor 900 that includes a video image processor unit 902 and a multiplexer MUX 904.

FIG. 9A shows the flow of pixel data with a solid line and the flow of analyzed data and control information with a dotted line. In some embodiments, a stream of pixel data from computer 10 on interface 40 is forwarded to a video window locator 100 of an enhanced display processor 20. The video window locator 100 provides video window location data to a video image processor 900. The video image processor 900 modifies pixels within the original stream of pixel data to create an enhanced video image to be supplied to internal interface 60. The entire input stream of pixel data 40 is multiplexed with the data representing the enhanced video image 2 using a MUX 904. MUX 904 supplies an output stream of pixel data 50 to the computer display 30. The controller and sequencer 400 controls and sequences operations between the video window locator 100 and the video image processor 900.

FIG. 9B is a block diagram of a second computer system 1 including an alternative enhanced display processor 20 in accordance with the present invention. The enhanced display processor 20 includes a video window locator unit 100 and a controller and sequencer unit 400 of FIG. 9A, and includes a video image processor 900 that includes a switch 303 and a multiplier 305.

If the processing of pixel data from interface 40 requires simple scaling in order to create enhanced video data, a switch 303 and a multiplier 305 may be used instead of video image processor unit 902 and MUX 904 of FIG. 9A. One input of the multiplier 305 is supplied by the interface 40. The second input of the multiplier 305 is supplied by the switch 303. The controller and sequencer 400 control the switch 303. The switch 303 supplies either a unity '1' value or a MOD value. When the video window locator 100 and the controller and sequencer 400 determine that the current pixel data on interface 40 represents a graphics pixel, controller and sequencer 400 set the multiplier to a unity '1' value. Multiplying by the unity value does not alter the pixel data, therefore the graphics pixel data passes unchanged to the computer display 30. When the video window locator 100 and the controller and sequencer 400 determine that the current pixel data on interface 40 represents a video pixel, controller and sequencer 400 sets the multiplier to the MOD value. By multiplying using the MOD value, video pixel data are enhanced before being passed to the computer display 30. In some embodiments, the operator configures the MOD value. In other embodiments, the MOD value is pre-determined or dynamically adjusted.

By supplementing or replacing the switch 303 and multiplier 305 with more complex functional units, an enhanced display processor 20 can support features beyond video window enhancement. For example, in an alternate embodiment, the multiplier 305 of processor 900 is replaced or augmented with additional arithmetic functions such as a clip, clamp, adder and/or trigonometric functions. By augmenting the video image processor 900, an enhanced display processor 20 could support the implementation of special effects. A clip sets a minimum allowable value. A clamp sets a maximum allowable value. An adder adjusts brightness. Trigonometric functions may be used to rotate an image in color space. In a further alternative embodiment, the switch 303 and multiplier 305 could be replaced with a logic processor for performing more complicated video effects functions, such as bit AND-ing, bit rotation, chroma keying and flipping.

Enhanced display processor 20, including units 100, 400 and 900, may be implemented as a combination of one or more of electronic circuitry, integrated circuits, and software on a microprocessor or microcontroller. Memory (not shown) may be shared or reside within each unit.

FIG. 10 illustrates two modules within the video window locator 100 according to some embodiments of the present invention. The enhanced display processor 20 includes a video window locator unit 100 and a controller, sequencer unit 400, and a video image processor 900. The video window locator unit 100 includes a temporal calculations and analysis unit 500, a spatial calculations and analysis unit 600, and a boundary determination unit 700.

An input stream of pixel data flows from the computer 10 along interface 40 to the video window locator 100. Two modules within video window locator 100 access the input stream of data: temporal calculation and analysis module 500 and spatial calculation and analysis module 600. The video window locator 100 may include only one or both of the two modules. Each module is described in more detail below.

The temporal calculation and analysis module 500 analyzes changes from frame to frame over time. The spatial calculation and analysis module 600 analyzes pixel data with respect to neighboring pixels, that is, in the x- and y-dimensions within a frame of data. Functionally, both temporal calculation and analysis may precede that of the spatial calculation and analysis, or visa versa, or they may be performed in parallel as shown here.

Results from the temporal calculation and analysis module 500 and the spatial calculation and analysis module 600 are passed to a boundary determination module 700. As described below, the boundary determination module 700 utilizes the analysis results to calculate the boundaries of a video window. The resulting boundaries are provided to the controller and sequencer 400.

Figure 11A:
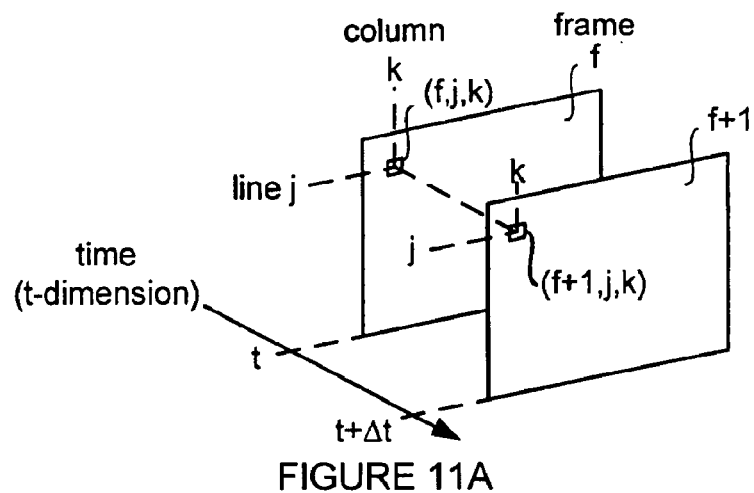
FIGS. 11A and 11B contrast the differences between temporal calculation and analysis and spatial calculation and analysis.
Figure 11B:
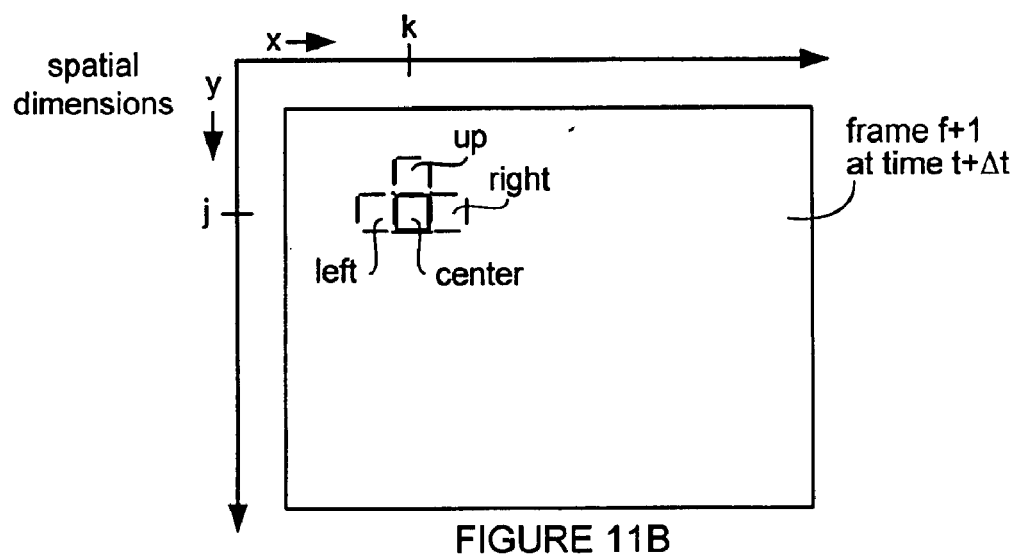

FIGS. 11A and 11B contrast the differences between temporal calculation and analysis and spatial calculation and analysis. Temporal analysis involves comparing corresponding pixels at the same spatial coordinates but in different frames (e.g. the pixels in row j and column k of both frame f at time t and frame f+1 at time t+Δt). In addition, temporal calculations may use non-sequential frames, i.e. frames separated by more than one frame period Δt. Spatial analysis on the other hand involves comparing nearby pixels within the same frame. For convenience and to save memory, spatial analysis may use either one of the two frames used in the temporal analysis.

Referring to FIG. 11A, each of frame f and frame f+1 is composed of a fixed number of rows (lines); and each line is composed of a fixed number of pixels. In this temporal calculation and analysis, a pixel at <f, j, k> (frame f, row j, column k) might be compared to a pixel at <f+1, j, k> (a similarly positioned pixel from the next frame). If an interlaced format is used, pixels from either the odd or even field f are compared with similarly positioned pixels from a subsequent odd or even field f+1. Similarly positioned pixels in this instance might be the i-th row from first odd field and the i-th row from the next add field. Alternatively, frames may be skipped before comparing a corresponding pixel such that pixel <f, j, k> is compared to <f+n, j, k> where 'n' is a positive integer. Alternatively, the fields may be combined into frames and then frames compared as in progressive mode, i.e. fields f and f+1 might be combined into one frame and then fields f+2 and f+3 combined into another frame; and then identical rows could be compared in each frame.

FIG. 11B shows a single frame: frame f+1. Spatial calculation and analysis involves comparing a center pixel to one or more of its nearby pixels. The cost and complexity of providing additional memory for a system may limit the number of spatial neighbors that can be compared to the center pixel, but generally this is much less of a consideration as compared to the memory required for temporal differences.

FIGS. 11C through 11F show examples of sets of pixels used for spatial calculation and analysis. For spatial calculations, adjacent pixel positions are selected to help determine whether a pixel is a graphics pixel. If a comparison between a center pixel and an adjacent pixel shows a very small or very large difference in value, it is more likely that the center pixel is a graphics pixel. A very small change or no change may represent a fixed color graphics object. A very large change may represent the border between two graphics objects. By selecting a center pixel and an adjacent pixel (e.g., the neighboring pixel just to the right 651 of FIG. 11C), graphics pixels may be detected. By selecting a subset of adjacent pixels (e.g. 651–658 of FIG. 11C), more certainty is realized in the detection Subsequent spatial testing (e.g., the auto correlation later described) may aid in the reclassification of misclassified graphics pixel s as moving pixels or video pixels.

Figure 11C:
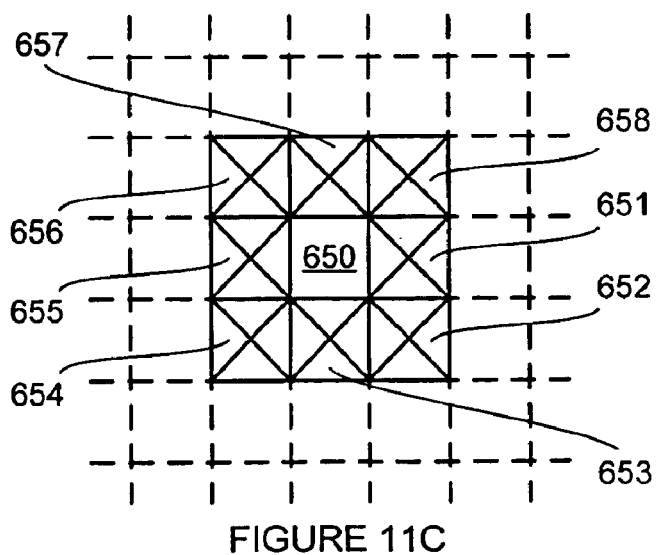
FIGS. 11C through 11F show examples of sets of pixels used for spatial analysis.

FIG. 11C shows a portion of frame of pixel data including a center pixel 650 and nine pixels immediately neighboring the center pixel 650 including a right pixel 651, a right-down pixel 652, a down pixel 653, a left-down pixel 654, a left-pixel 655, a left-up pixel 656, an up pixel 657 and a right-up pixel 658. Immediately neighboring pixels 651–658 are pixels a distance of one location away from the c enter pixel 650 and form a ring around the center pixel 650. In some embodiments, pixels farther in proximity to the center pixel, that is, pixels two or three locations away from the center pixel, are included in spatial calculations along with the center pixel.

Figure 11D:
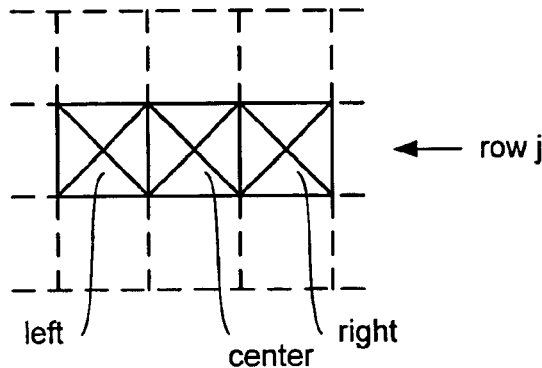

FIG. 11D shows an example of a pixel from a single row used in spatial calculation and analysis. When the current row is available, spatial calculations and analysis can compare the center pixel to the pixel to the left of the center pixel; and can also compare the center pixel to the pixel to the right of the center pixel. Here, the center pixel is compared to just the left and right pixels during spatial analysis. In addition, the center pixel can be com pared to pixels located two or three pixel s away from the center pixel, as for example when estimating higher order derivatives.

In some embodiments, a three-pixel delay line contains the left, center and right pixels. In other embodiments, a small RAM may be used to store a few contiguous pixels from the same row. In still other embodiments, an entire row of pixel information is temporarily stored in a small RAM or a line buffer.

Figure 11E:
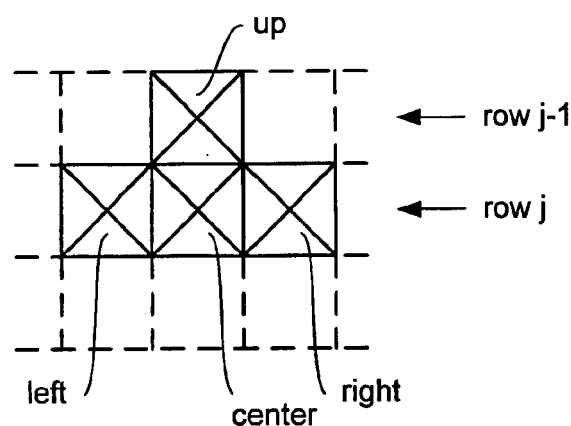

FIG. 11E shows an example of pixels from two rows. In the example shown, a center pixel and three of its neighboring pixels are shown: labeled (1) "left"; (2) "right"; and (3) "up". The current row j contains a center pixel as well as a pixel immediately to the left and a pixel immediately to the right of the center pixel. If a one-line buffer is available, a previous row j–1 could be preserved in the line buffer and be available for use in spatial calculation and analysis. Here, an "up" pixel is shown in the previous row, and is used in conjunction with the left and right pixels when analyzing the center pixel during spatial analysis.

Figure 11F:
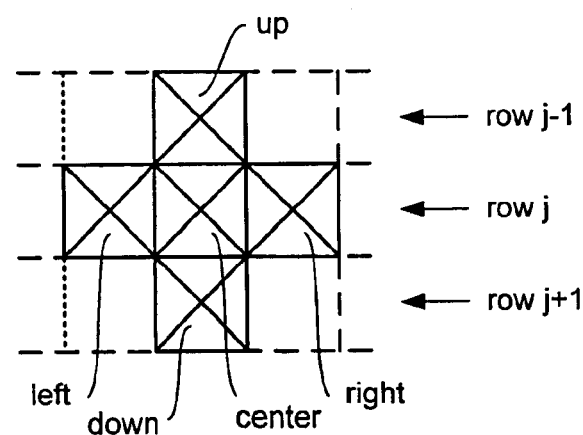

FIG. 11F shows an example of pixels from three rows. If two line buffers are available, spatial calculation and analysis can select at least four pixels immediately neighboring a center pixel on row j–1: (1) "left"—a pixel on row j–1 preceding the center pixel; (2) "right"—a pixel on row j–1 following the center pixel; (3) "up"—a pixel on row j–2 above the center pixel; and (4) "down"—a pixel on row j below the center pixel. Here, the four pixels (left, right, up and down) are compared with the center pixel during spatial analysis.

If only horizontal neighbors are compared as shown in FIG. 11D, a buffer for row j–1 is not needed, thus memory requirements are reduced. If horizontal neighbors and a vertical neighbor (e.g., left, right and up) are compared to the center location as shown in FIG. 11E, a previous line buffer is needed for row j–1. Similarly, if horizontal and two vertical neighbors (e.g., left, right, up and down) are compared as shown in FIG. 11F, two previous line buffers are needed, one for row j–1 and one for row j.

In some embodiments, pixel information used during spatial analysis is also used during temporal analysis. By sharing data, the same data is used multiple times, thus the time to load and access new data is eliminated and memory is saved.

Figure 12:
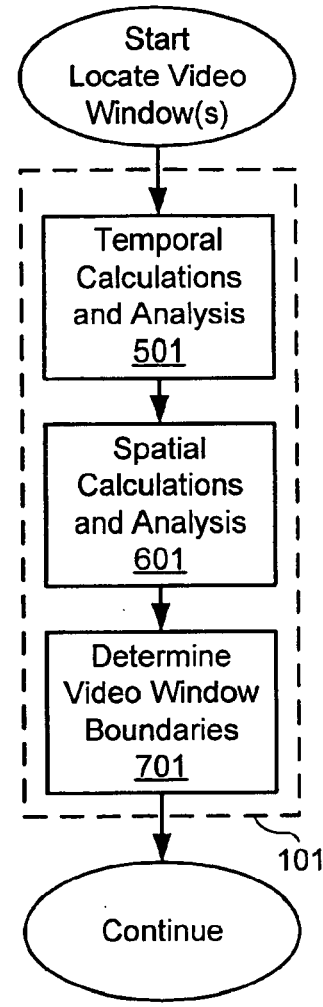
FIG. 12 shows a flow chart of a locate video window(s) step according to some embodiments of the current invention.

FIG. 12 shows a flow chart of a "locate video window(s)" step 101 of FIG. 3 according to some embodiments of the current invention. The flowchart of FIG. 12 also shows an implementation of the data flow diagram of video window locator module 100 of FIG. 10. In some embodiments, a "locate video window(s)" step 101 sequentially performs temporal calculation and analysis 501 on a first and second frame, and performs spatial calculation and analysis 601 on the second frame. In other words, a first set of rows from a first frame is saved, then for each of a set of corresponding rows from a second frame, temporal calculation and analysis and spatial calculation and analysis are performed.

Subsequently, temporal calculation and analysis 501 and spatial calculation and analysis 601 results are available for determining video window boundaries 701. The action of determining video window boundaries is further described beginning with reference to FIG. 25.

As described above, temporal and spatial calculations require memory to save rows of pixel information. Saving each and every pixel from each row from an earlier frame requires a very large amount of memory. Methods to reduce the required memory include: (1) pixel traversing; (2) pixel reduction; (3) vertical decimation; and (4) horizontal decimation. Reducing the number of pixels stored per frame reduces response time to detect new windows but allows for lower cost implementation without necessarily neglecting the task of examining each pixel location of a frame in an effort to perform temporal and spatial calculations and analysis.

A first method to save memory is by pixel traversing. Pixel traversing spreads the sampling and analysis of each pixel position of a frame across multiple frames. For example, pixel traversing involves starting with a first pixel position and sampling the first pair of frames such that every Nth pixel on a row is sampled. At the end of the row, a predetermined number of rows are skipped, then again every Nth pixel of a row is sampled. This subset of pixels are used in temporal and spatial calculations. Next, processing advances to the next row, skips a predetermined number of pixels, then samples every Nth pixel. At the end of the row, a predetermined number of rows are skipped and sampling begins again until the end of the frame is reached. A corresponding set of pixels are sampled and analyzed from the second frame of the pair of frames. Subsequent pairs of frames are similarly sampled however the first pixel position for each pair of frames changes such that the series of first pixel positions traverse pixel positions such that each pixel position of a frame is at some time sampled. The larger the steps between sampled pixels in a row, and the larger step taken when skipping rows, leads to a large number of first pixel positions and a corresponding large number of frames that must be traversed until each pixel position has been sampled once. Once each pixel position has been sampled, the process repeats.

By spreading the sampling across multiple frames, only a subset of pixels are sampled and analyzed with each pair of frames. The frame buffer that once held an entire frame may be replaced with a significantly smaller buffer. The smaller buffer holds just a subset of pixels. (The subset may be defined as described below with regard to vertical and horizontal decimation.) The smaller buffer first holds one set of pixels from a pair of frames, then holds another set of non-overlapping pixels from a next pair of frames. Alternatively, it would not be necessary to have a second buffer if the system processes data in real-time and pixel data is retrieved from the system's pixel input buffer. The process continues until each pixel position of a frame has been traversed, which will occur over time.

A second method to save memory is by pixel reduction. Pixel reduction reduces the number of bits necessary to represent a single pixel. Not all of the information used to represent a pixel is essential for temporal and spatial calculation and analysis. Computers often represent pixel data using three components. In some embodiments, selecting just the luminance component of the pixel data is sufficient for analysis. Alternatively, the green component of the pixel data serves the same purpose. Selecting just the luminance or green value of a pixel rather than using the full pixel representation of three or four color components provides a significant memory requirement reduction.

A third method to save memory is by vertical decimation. Vertical decimation selects a subset of frame rows to process. Analyzing every Nth row helps to provide a rough thumbnail estimate of image properties and reduces the processing necessary for a frame by approximately a factor of N. To analyze every row requires N+1 frames initially and potentially as few as an additional N frames thereafter with some additional memory expense. Alternatively, the analysis could always be performed in N+1 frames without any additional memory, where the extra frame is used to re-initialize the process. Re-intialization performs no temporal or spatial calculation and analysis but reloads the initial line buffers at the top of each stripe. To analyze in N frames requires an extra line buffer and additional indexing logic.

One method of implementing vertical decimation uses horizontal stripes. Dividing a frame into horizontal stripes simplifies vertical decimation. For each frame, analysis is performed on one row of pixels for each stripe.

Figure 13:
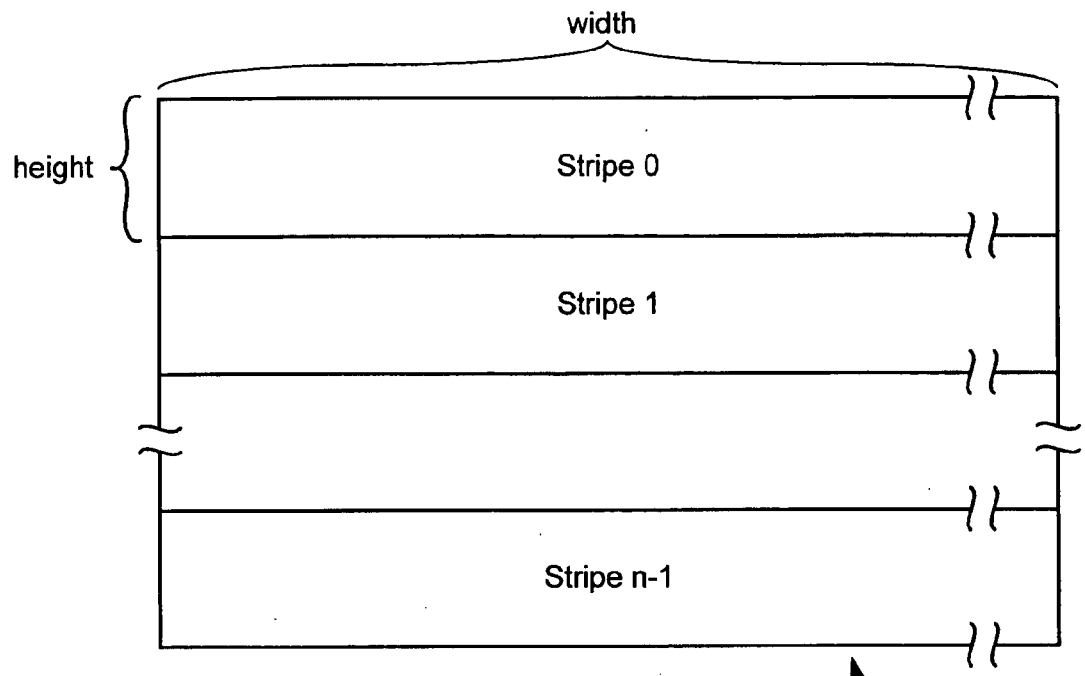
FIG. 13 shows an example of vertical decimation using stripes in accordance with the present invention.

FIG. 13 shows an example of vertical decimation using stripes. Only N rows of pixel data (one row per stripe) are processed per frame or pair of frames. For example, dividing a 640×480 format frame may be divided into sixteen stripes, e.g., stripes zero through fifteen, each including a width of 640 active pixels and a height of 30 active rows. After 31 frames are processed, each row of each stripe in the frame has been analyzed once. As another example of vertical decimation, a frame with 1600 active pixels in 1200 active rows may be similarly divided into 16 stripes, e.g., stripes zero through fifteen, each including 75 rows of 1600 pixels per row. After 76 frames are processed, each row in the frame has been analyzed once.

A fourth method to save memory is by horizontal decimation. Horizontal decimation lowers the size of memory required by reducing the number of samples taken. Rather than processing each and every pixel of a row of pixels , horizontal decimation systematically skips one or more pixels in a row. Decimation-by-1 means that every pixel is sampled, thus no improvement in memory storage requirements are obtained. Decimation-by-2 means that every other pixel is sampled, thus reducing the memory requirements by half. Similarly, decimation-by-4 means that every fourth pixel is sampled, thus reducing the memory requirements by a fourth. Alternatively, a variable decimation pattern may be used such that a particular subset of pixels is selected where the pixels selected are not necessarily evenly spaced.

FIGS. 14A–14G illustrate an example of vertical decimation, horizontal decimation, and pixel traversing as part of a temporal calculation and analysis 501. The example shows vertical decimation by the use of stripes, horizontal decimation by skipping pixels in a row, and pixel traversing by using a new starting point for each pair of frames. Table 1 below correlates the information provided in FIGS. 14A–14G. For this example, assume a temporal calculation and analysis method processes frames in overlapping sequential pairs of frames. That is, the first pair of frames consists of frames 1 and 2. The second pair of frames consists of frames 2 and 3. Note that frame 2 is both a frame in the first pair and the second pair. The next pair of frames consists of frames 4 and 5, and so on.

Alternatively, the frame pairs used are non-overlapping sequential pairs. For example, the first pair consists of frames 1 and 2. The second pair consists of frames 3 and 4. The next pair of frames consists of 5 and 6, and so on. The use of non-overlapping sequential frame pairs requires less memory at the cost of increased time necessary to analyze each pixel position.

Frames are decimated vertically using stripes. Frames are decimated horizontally by sampling every Nth pixel. In the example shown, a stripe contains 5 rows and every fourth pixel is sampled. In some embodiments, an extra frame is required to begin processing the first row of a stripe. With a stripe height of 5, decimation-by-4, and allowing for an extra frame when the first row of a stripe is processed, twenty four (6*4=24) pairs of frames (frames 1 through 24) are required to traverse each pixel location within the stripe.

Figure 14A:
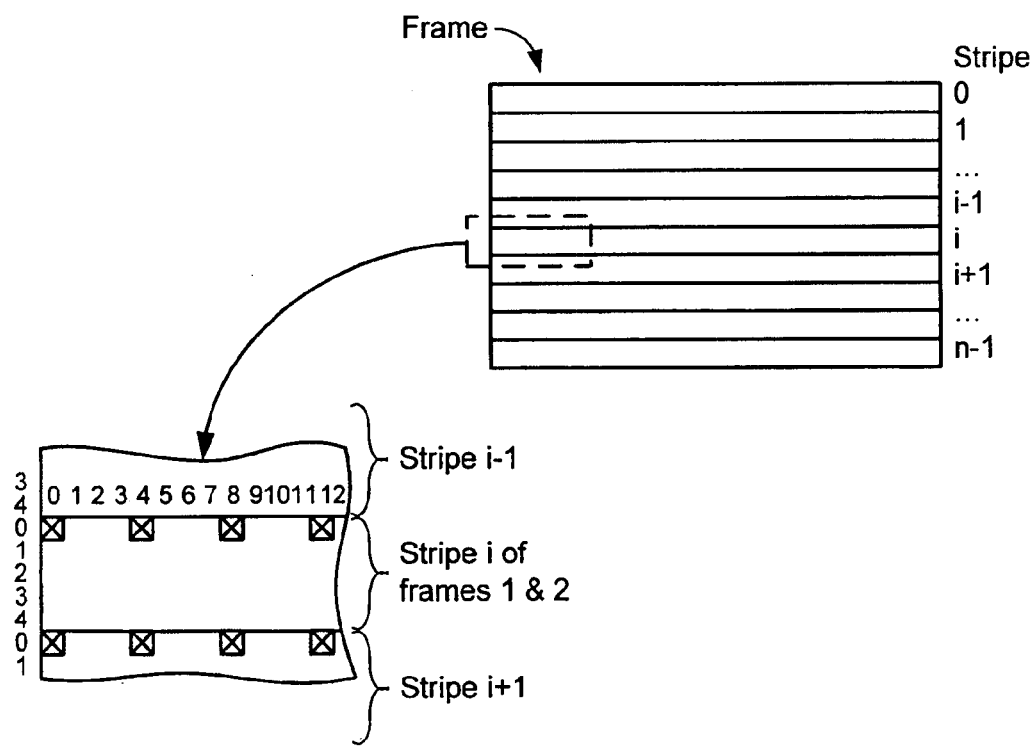

FIG. 14A shows the subset of pixels that are selected and processed for the first pair of frames. As described above, each frame is subdivided into a set of stripes. Each stripe from the first pair of frames is similarly sampled. That is, the pixel positions that are shown to be sampled in stripe i of FIG. 14A are sampled in each stripe of both frames of the first frame pair. For each stripe of the first two frames, temporal calculation and analysis 501 uses every fourth pixel on the first stripe row, i.e., row 0, column 0, 4, 8, 12 et seq.

FIG. 14B shows the second set of pixels that are sampled for each stripe of the second pair of frames. Pixels are sampled from stripe row 1 that lie in columns 1, 5, 9, 13 et seq. In this example, the starting pixel position has traversed over one column and down one stripe row. Alternatively, instead of traversing to the next row, traversing could parse the remaining unsampled area or skip multiple rows. Thus, whereas the first frame pair would use row 0 from each stripe, the second frame pair would not use row 1 as previously described, but rather row 2 or row 4, for example. This would have the effect of getting a faster estimate of the video window locations.

FIG. 14C shows the third set of pixels that are sampled for each stripe of the third pair of frames. Again, the starting pixel position has traversed over one column and down one stripe row. Pixels are sampled from stripe row 2 that lie in columns 2, 6, 10, 14 et seq.

FIGS. 14D through 14G show the progression of pixel sampling for successive pairs of frames. Pixel traversing continues such that eventually each pixel position of a stripe is sampled once. The approximate time necessary to sample each pixel position once is calculated by determining the number of pixels in a stripe, dividing by the horizontal decimation rate, then multiplying by the time between frames. If non-overlapping frames are used, the duration is approximately doubled.

When using overlapping pairs of frames, the necessary hardware is simplified by restarting with a new non-overlapping pair of frames whenever traversing from the last row to the first row occurs. If the last stripe row is analyzed in one pair of frames (e.g., frames 5 and 6 as shown in FIG. 14E), then the first stripe row is analyzed using a new set of frames, neither used earlier (e.g., frames 7 and 8 as shown in FIG. 14F).

Note that for the example shown, frame 6 was not reused for processing the top of the stripe. By restarting with a non-overlapping pair of frames, a line buffer and logic is discarded. The time necessary to traverse each pixel position in a stripe is only marginally increased by using this scheme.

This scheme, which uses overlapping frames and restarting non-overlapping frames when analyzing the first stripe row, is shown in table 1. The sequence ends with the 24th frame.

TABLE 1

Decimation Pattern

| Related FIG. | Frame Pair | Stripe Row | Columns for the first stripe in the designated frame pair |
|---|---|---|---|
| 14A | 1 & 2 | 0 | 0, 4, 8, 12 etc. |
| 14B | 2 & 3 | 1 | 1, 5, 9, 13 etc. |
| 14C | 3 & 4 | 2 | 2, 6, 10, 14 etc. |
| 14D | 4 & 5 | 3 | 3, 7, 11, 15 etc. |
| 14B | 5 & 6 | 4 | 0, 4, 8, 12 etc. |
| 14F | 7 & 8 | 0 | 1, 5, 9, 13 etc. |
| 14G | 8 & 9 | 1 | 2, 6, 10, 14 etc. |
| (none) | 9 & 10 | 2 | 3, 7, 11, 15 etc. |
|  | 10 & 11 | 3 | 0, 4, 8, 12 etc. |
|  | 11 & 12 | 4 | 1, 5, 9, 13 etc. |
|  | 13 & 14 | 0 | 2, 6, 10, 14 etc. |
|  | 14 & 15 | 1 | 3, 7, 11, 15 etc. |
|  | 15 & 16 | 2 | 0, 4, 8, 12 etc. |
|  | 16 & 17 | 3 | 1, 5, 9, 13 etc. |
|  | 17 & 18 | 4 | 2, 6, 10, 14 etc. |
|  | 19 & 20 | 0 | 3, 7, 11, 15 etc. |
|  | 20 & 21 | 1 | 0, 4, 8, 12 etc. |
|  | 21 & 22 | 2 | 1, 5, 9, 13 etc. |
|  | 22 & 23 | 3 | 2, 6, 10, 14 etc. |
|  | 23 & 24 | 4 | 3, 7, 11, 15 etc. |

FIG. 15 illustrates storing vertically and horizontally decimated data into a line buffer and into an array of line buffers. In the example given above for vertical decimation by 4, for each stripe of a frame, one-fourth of a row is stored. For the decimation-by-2 case shown in FIG. 15, every other pixel position 7 is sampled. The sampled pixels are stored into a corresponding position of a line buffer 8. In some embodiments, line buffer 8 is part of an array of N line buffers as shown.

Using only green components, which approximate the luminance, vertical decimation with sixteen stripes, and horizontal decimation significantly reduces the required amount of memory necessary to characterize a frame of pixel data. For example, the amount of memory required to process a 1600 by 1200 24-bit RGB frame reduces from approximately 5.76 million bytes to approximately 6.8 thousand bytes. Instead of using only the green component, a luminance value may be used. If the data is in RGB format, a luminance value may be computed from the RGB data. In other formats, the luminance value may be extracted directly from the data without further computation. Rather than processing every pixel in a single pair of frames, the same amount of temporal calculation and analysis is spread over a number of frames with a worst case loss of accuracy of about 75 rows vertically and four pixels horizontally after the first frame pair and a worst case loss of accuracy of only 4 rows vertically after about 20 frames (if the stripe row increment is 4 for each new frame pair), in locating a stationary video window. Here, temporal calculation and analysis traverses and processes each pixel position of a frame after approximately $$\left(\frac{1200}{16} + 1\right)(4) = 304$$

pairs of frames.

Figure 16:
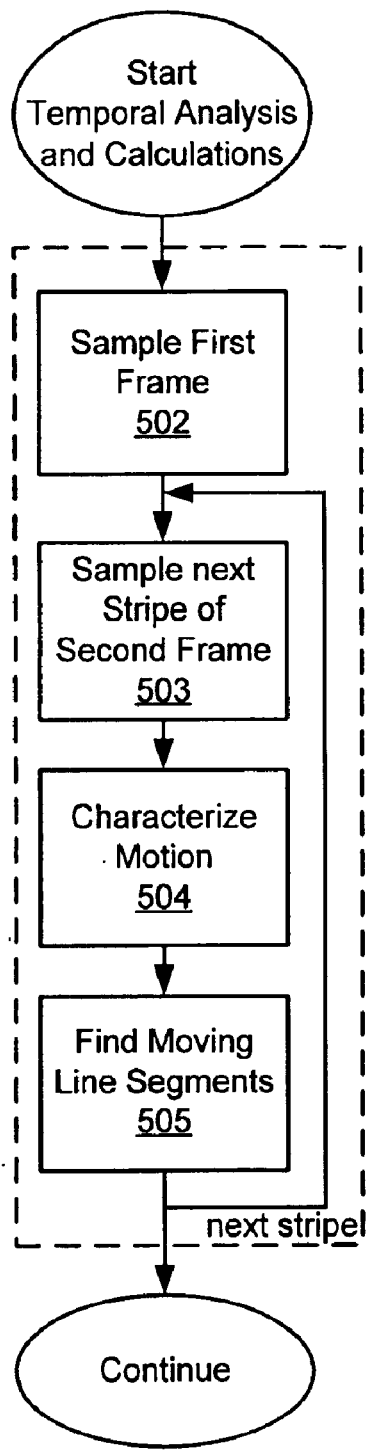
FIG. 16 is a high-level block diagram of an example of temporal calculation and analysis in accordance with the present invention.

FIG. 16 is a high-level block diagram of an example of temporal calculation and analysis. The array of N line buffers 9, shown in FIG. 15, is used to hold sampled pixel information for temporal processing. In step 502, a first set of pixels are saved from a first frame. In step 504, pixels from a second frame are examined and used to identify motion; and at the same time, in step 505, this identification is used to locate moving line segments. Afterwards, in step 503, a different set of pixels from the second frame are saved. Steps 504, 505, and 503 are then repeated in order for subsequent frames. An implementation of each step is described in more detail below. In step 502, a first frame is presented. A subset of pixels extracted from this first frame are then saved. For example, a frame of pixel data may be decimated horizontally and vertically, and the pixel data may be reduced as described above. The selected pixels might be stored in an array of line buffers as shown in FIG. 15. If sixteen stripes are defined, then sixteen rows from the frame are identified and saved to the array of line buffers 9.

In step 504, another frame is presented and is now designated as the current frame. The last frame from which pixels were stored is designated as the previous frame. Some pixels in the current frame are identified as coming from the same spatial location as for the pixels stored from the previous frame. Pixel data from the current frame is subtracted from pixel data similarly positioned from the previous frame. The results may be stored in the array of line buffers 9 and are used to identify motion pixels contained in video windows.

In parallel with step 504, step 505 utilizes the results from step 504 to determine whether or not a set of motion pixels constitute a moving line segment. A grouping of motion pixels defines a moving line segment. In some embodiments, when a set length of neighboring pixels includes more than a defined threshold number of motion pixels, that set of pixels, which may include some stationary pixels, is defined as a moving line segment. In other embodiments a defined number of contiguous motion pixels are required to identify a moving line segment.

In step 503 of FIG. 16, another set of pixels from the next stripe of current frame is identified and saved. To conserve memory, pixel data from the current frame is sampled, and processed in steps 504 and 505 before the next set of pixels from the next stripe is saved. As step 503 is performed on subsequent frames, a new subset of pixels in each stripe is identified and held such that all pixel positions are eventually stored and processed.

In this manner, steps 503, 504 and 505 are performed once for each stripe of the current frame. That is, for each row in the previous frame, a corresponding row in the new frame is sampled in step 503, motion is characterized in step 504, and moving line segments are found in step 505; and finally the process repeats as the next row in the stripe is saved to memory in step 503. Once a row is processed, another row of pixels from the next stripe in the previous and current frames are similarly processed until all rows in all the stripes have been processed.

To reduce the amount of data processed, each pixel held in steps 502 and 503 may be reduced to its luminance value or some other equivalent representative value. Alternatively, the pixel's full description may be used.

Figure 17:
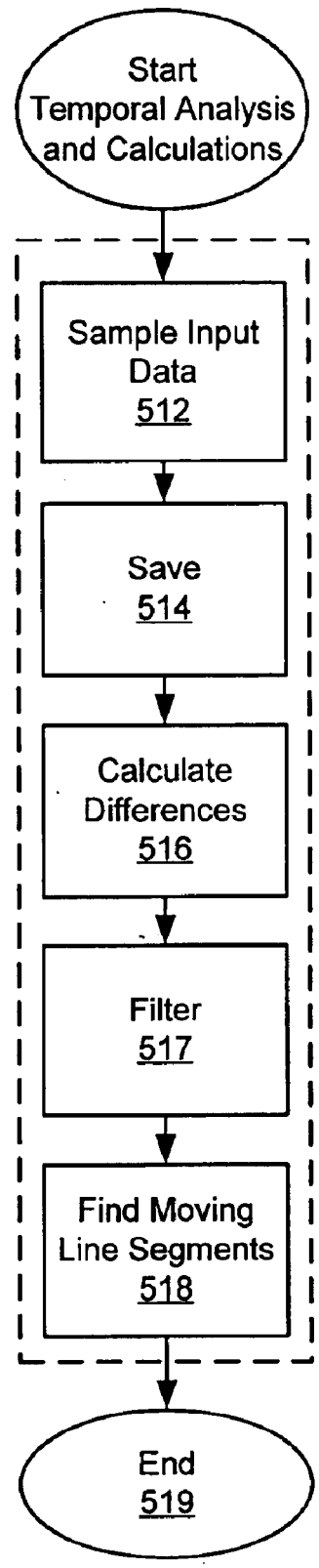
FIG. 17 is a detailed block diagram of an implementation of a temporal calculation and analysis process in accordance with the present invention.

FIG. 17 is a block diagram of an alternate implementation of a temporal calculation and analysis process of FIG. 16. Before the temporal calculation and analysis process begins, frame is partitioned into horizontal stripes each of which comprises the same number of contiguous rows of active video with the caveat that one stripe might have to contain fewer rows than all the others depending on the number of stripes and the number of active video lines. Nevertheless, it is desirable to make the number of rows in all the stripes as nearly the same as possible. A subset of all the frame data is stored from the first frame. Towards this end, the first row in each stripe is designated as the selected row. This selected row of frame data from each stripe is captured from the data input stream; i.e., rows are discarded until the current row is the selected row for each stripe. If horizontal decimation is enabled, then only some fraction of the total number of pixels on a selected row is saved; i.e., only every Nth pixel of a row is preserved. The horizontal decimation value N may be any positive integer, for example, 1, 2 or 4, or in other embodiments, this decimation interval may vary along a row from pixel to pixel. The pixel data may be further reduced to a representative value, such as luminance, before being stored.

In step 512, the current frame is received as an input data stream. A set of the most recently received and consecutive pixels, or just the luminance pixel components, are temporarily stored in local registers. Pixels in the current frame, which have the same spatial location as pixels stored from the previous frame, are identified as selected pixels. In step 514, the data is stored, for example, in the array of line buffers 9 of FIG. 15.

In step 516, a temporal difference is calculated between the selected pixel in the previous frame and the similarly located selected pixel in the current frame. The selected pixels are subtracted from the other and the absolute value taken. In some embodiments, an array of line buffers (indexed by stripe and column) contains the pixel value from the previous frame. These differences are considered and then sent to a moving line detection state machine. Shown here, an array of line buffers (indicated as: line_buffer_array) holds the pixel data for the selected row of each stripe from the previous frame. Local registers store the current frame's pixel data. A formula for calculating the difference is:

diff(selected col)=|line_buffer_array(previous frame, stripe, selected row, selected col)−local_register(current frame, stripe, selected row, selected col)|

Step 517 shows the optional step of low-pass filtering the differences in order to reduce any "noise." A low pass filter employed for this purpose would attenuates the high frequency variations which are frequently present in first derivative approximations of data, which are inherently noisy. The filter may sacrifice performance for implementation efficiency by choosing a small number of low bit weighting factors. A simple example of a low pass filter is given as follows:

final_diff(col)=(diff(col−1)+2*diff(col)+diff(col+1))/4//generally;

final_diff(0)=(diff(0)+diff(1))/2//first; and final_diff(n−1)=(diff(n−2)+diff(n−1))/2//last;

where col=0, 1, . . . n−1 and there are n pixels stored per row. A more sophisticated approach to noise reduction of an alternate embodiment might employ a three tap Hamming filter or other more complicated filter at the cost of implementation expense and complexity. In some embodiments, a particular spatial difference value is not low pass filtered if the temporal difference value exceeds a set threshold. By not low pass filtering, the spatial difference values with large differences, sharp transition along edges of objects in pictures are preserved. In some embodiments, the difference diff( ) or the final difference final_diff( ), if calculated, is compared to a defined threshold to determine whether the pixel is categorized as a motion pixel or a stationary pixel. If the difference is greater than the defined threshold, then the pixel is categorized as a motion pixel.

In step 518, the moving line segments are found as further described below with reference to FIG. 18. As indicated by 519, the process ends, however, the temporal calculation and analysis process continues indefinitely as a task.

Figure 18:
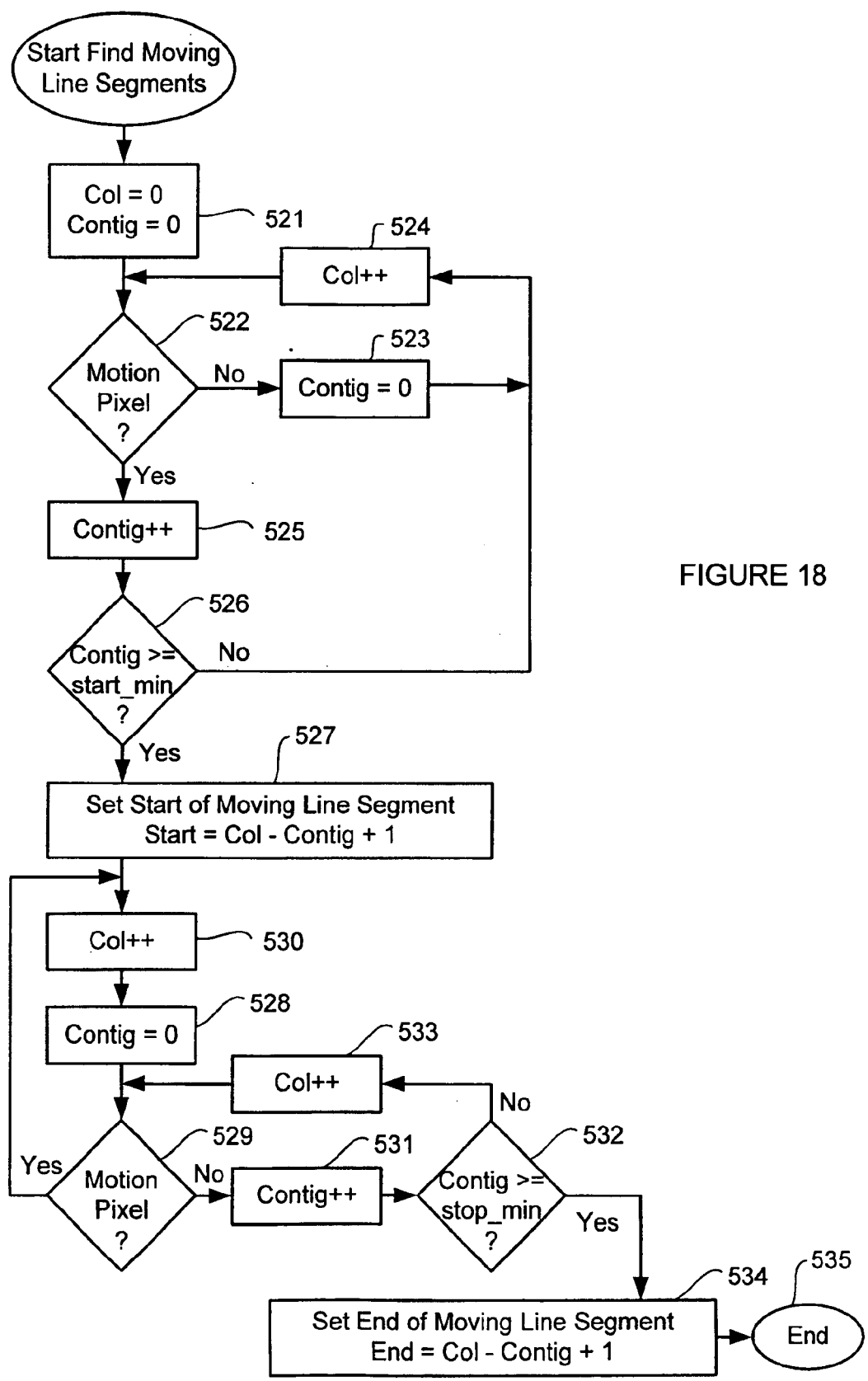
FIG. 18 is a detailed flow chart of a method to find moving line segments in accordance with the present invention.

FIG. 18 is a detailed flow chart of step 518 to find moving line segments. Step 521 initializes a column counter and a contiguous counter. The column counter (col) is an index used to step through the difference values (i.e., diff( ) or final_diff( )). The contiguous counter is used to count the number of contiguous motion or graphics pixels that exist in a sequence.

Next in step 522, the difference value is compared to a threshold to determine whether a pixel is categorized as a motion pixel. In step 523, if the pixel is not a motion pixel, the contiguous counter is reset, the column counter is incremented in step 524, then the next difference is similarly tested in step 522. If the pixel is a motion pixel, the contiguous counter is incremented in step 525, then checked in step 526 to determine whether a sufficient number of motion pixels have been detected contiguously. If an insufficient number of motion pixels exist contiguously, step 524 increments the column counter and the next pixel is tested in step 522. If a sufficient number of motion pixels exist contiguously, step 527 sets a start of a moving line segment at the beginning of the contiguous series of pixels, then step 530 increments the column index. Step 528 resets the contiguous counter in order to count the number of contiguous graphics pixels.

Next in step 529, the difference value is compared to a threshold to determine whether a pixel is categorized as a motion pixel. If the pixel is a motion pixel, the column counter is reset in step 530 and the contiguous counter is reset in step 528, then in step 529 the next difference is similarly tested. If the pixel is not a motion pixel, the contiguous counter is incremented in step 531, checked to determine whether a sufficient number of non-motion has been detected contiguously in step 532. In step 532, if an insufficient number of non-motion pixels exists contiguously, the column counter is incremented in step 533 and the next pixel is tested in step 529.

If a sufficient number of non-motion pixels exist contiguously 532, an end of a moving line segment is set at the point before the contiguous series of non-moving pixels in step 534. If the end of the row is reached before the end is detected, step 534 sets the end of the moving line segment to the end of the row. Once an end of the moving line segment is set in step 534, the process ends at step 535 where the process increments the column index and begins with step 522 again.

As an alternative to requiring a minimum number of contiguous moving or non-moving pixels to determine the start or end of moving line segments, an algorithm could require a minimum number of either pixel category to be present within a moving window of pixel locations. For example, 5 of 7 pixels of one type would define the beginning of that type of line segment rather than requiring four sequential pixels of one category to be present.

Spatial calculation and analysis differs from temporal calculation and analysis by the pixels that are compared. As described above, temporal calculation and analysis compares pixels between two different frames. Spatial calculation and analysis, on the other hand, compares pixels within the same frame.

Figure 19:
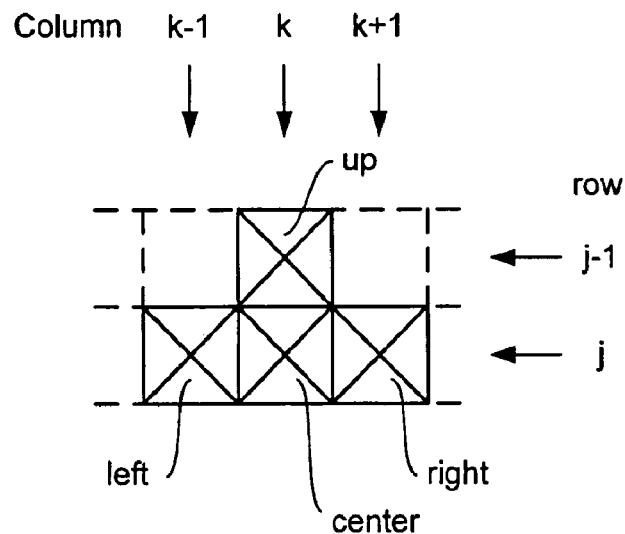
FIG. 19 shows an example of pixels used in spatial calculation and analysis further describing the illustration of FIG. 11D.

FIG. 19 shows an example of pixels used in spatial calculation and analysis further describing the illustration of FIG. 11B and 11E. Spatial calculation and analysis compares a center pixel to selected neighboring pixels around the center pixel. FIG. 19 shows a center pixel <j,k> (row j and column k) relative to two horizontal neighbors and to one vertical neighbor: (1) "left" pixel at <j,k−1>; (2) "right" pixel at <j,k+1>; and (3) "up" pixel at <j−1,k>. The diagonal pixels, upper-left<j−1,k−1>and upper-right<j−1,k+1>are maybe saved and available for computations but are not used in this example.

Figure 20:
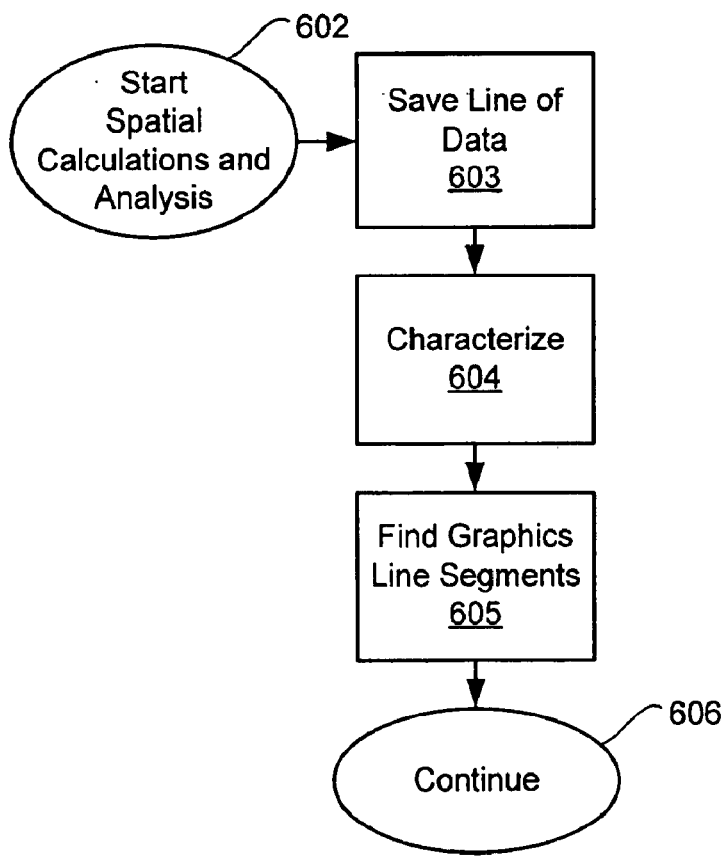
FIG. 20 is a high-level block diagram of spatial calculation and analysis in accordance with the present invention.

FIG. 20 is a high-level block diagram of an exemplary method of spatial calculation and analysis using the pixels selected in FIG. 19. In this analysis, pixel data from two rows of the current frame are selected. In step 603, the previous row is saved in a previous line buffer and the current row is held in a current line buffer.

If vertical decimation is enabled in the temporal calculation and analysis module, every Nth row is processed. Spatial calculation and analysis may also decimate vertically, however, every Nth row and the row preceding every Nth row are processed. Whether or not row j is the current row in temporal calculation and analysis, row j can be the current row of spatial calculation and analysis and will contain the "center" pixel. Row j−1 will be held in a previous line buffer and will contain the "up" pixel.

As with horizontal decimation in temporal calculation and analysis, spatial calculation and analysis can similarly implement horizontal decimation by limiting the number of "center" pixels analyzed in a frame in order to reduce the pixel information saved to the line buffers, thereby reducing memory needs. The left and right pixels would still be immediately adjacent to the center pixels regardless of the spacing of "center" pixels.

In step 604, the selected pixels from the current line buffer and previous line buffer are characterized by calculating spatial differences. In step 605, the characterization is used to find graphics line segments.

Figure 21:
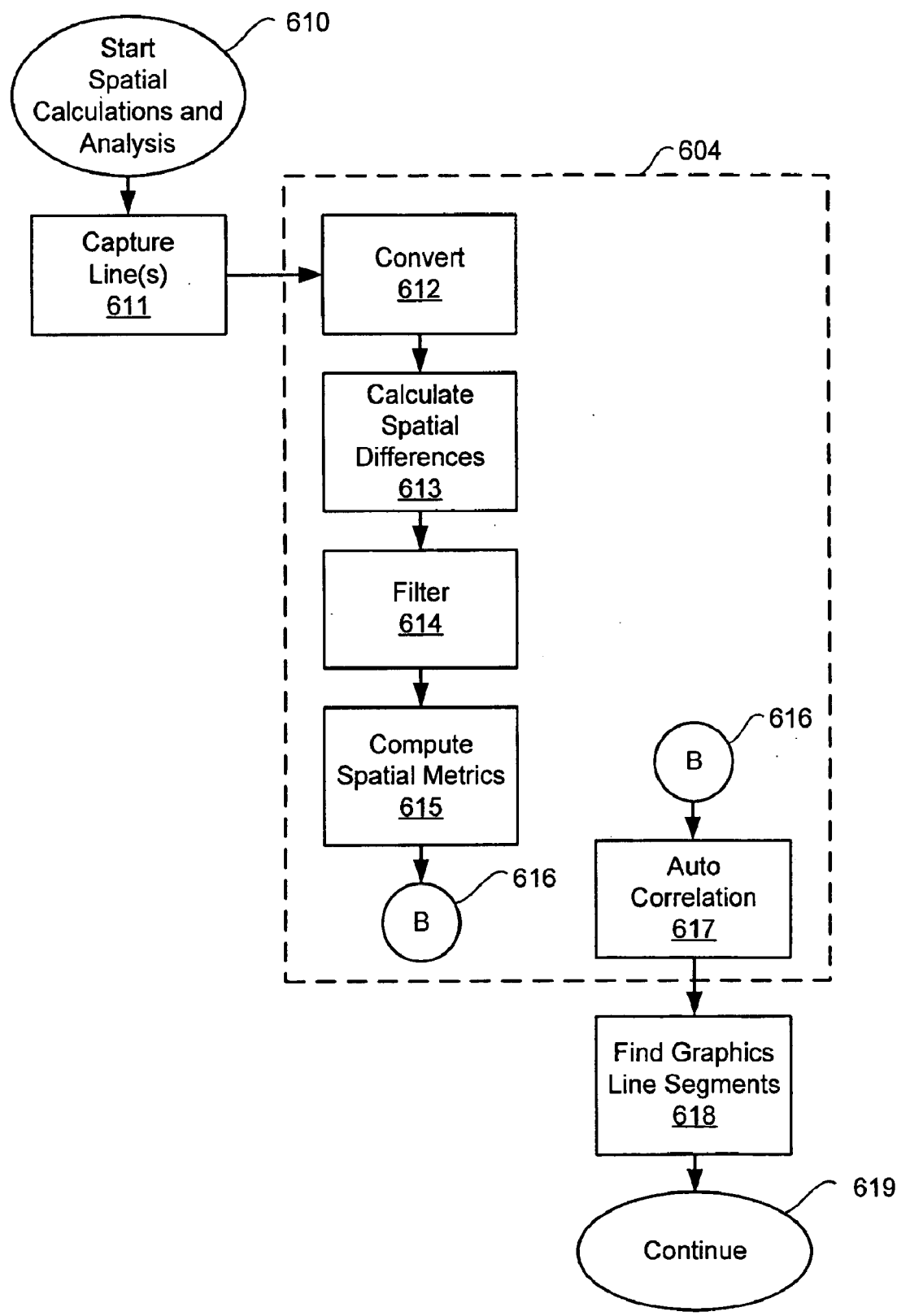
FIG. 21 is a detailed block diagram of an implementation of a spatial calculation and analysis process.

FIG. 21 is a detailed block diagram of an implementation of a spatial calculation and analysis process shown in FIG. 20. In step 611, a row containing the "up" pixels and a row containing "center" and neighboring pixels are received from the input stream of pixel data as similarly described earlier for step 603.

If vertical decimation is enabled, not all rows are necessarily processed. Every Nth row and each row preceding every Nth row may be processed. For example, if the "center" pixel is located in row j of a stripe, then the previous row j−1 containing the "up" pixel is saved.

After the "up" pixels are stored in a line buffer and the next frame row, which contains the left, center and right pixels, is buffered from the streaming input data, step 611 is complete.

Step 604 from FIG. 20 is shown expanded into steps 612 through 617.

In step 612, the pixel data may be converted as described above to a representative value such as luminance. Steps 611 and 612 may be combined such that only converted data is saved thereby reducing the local storage requirements.

In step 613, the spatial differences between the "center" pixel and neighboring pixels are calculated. In some embodiments, the spatial difference is the spatial first derivative of each pixel in a row. A pixel-by-pixel difference is calculated between any given "center" pixel and the pixels immediately above, to the right, and to the left of the given pixel in the same frame. A single previous line buffer (prev_line_buf) (e.g., 400 words×8-bits in size) holds the previous row's luminance values. The line buffer is indexed by a column index (col). Step 613 uses the previous line buffer and the current line buffer to calculate a difference to the right of the center pixel (diff_right), a difference to the pixel left of the center pixel (diff_left), and a difference to the pixel above the center pixel (diff_up). Each difference may be saved in an array defined as follows:

diff_right(col)=curr_line_buf(col)−curr_line_buf(col+1);

diff_left(col)=curr_line_buf(col)−curr_line_buf(col−1); and diff_up(col)=prev_line_buf(col)−curr_line_buf(col).

If processing pixels from the left to right, calculations of differences to the left can be simplified by copying the current diff_left to the previous columns diff_right. That is:

diff_left(col)=diff_right(col−1).

Additionally, when the center pixel is located on an edge of a frame or stripe, one or more of the neighboring pixels may be undefined. For example, when a center pixel is the first pixel of a row, it will not have a pixel to the left. When calculating difference values for a center pixel on an edge, the value of that difference may be set to a fixed value such as zero.

diff_left(0)=0;

diff_right(last col)=0; and diff_up(col)=0 when the current row is the top row.

Optionally, the resulting spatial differences are filtered in step 614. A low pass filter may be used to smooth out noise found in a video image. A low pass filter such as a moving average filter may be used. The "||" symbols indicate absolute value.

diff(col)=(|diff_right(col)|+|diff_left(col)|)/2

The absolute value may be taken as shown. Alternatively, the absolute value operation may be dropped if diff_right, diff_left and diff_up are calculated without a sign bit.

In step 615, a set of spatial metrics is computed. For convenience of later processing, the set of spatial metrics is computed to help determine whether a pixel is a graphics pixel and later for determining whether or not a line segment that has been classified as both a moving line segment and a graphics line segment should be considered as a video line segment. The following one-bit video window differences metrics (vwd metrics) may be computed using the spatial differences calculated above.

vwd_diff0(col)=(diff(col)<=threshold_0)?1:0;

vwd_diff1(col)=((diff(col)>threshold_0)&&(difference<=threshold_1))?1:0;

vwd_diff2(col)=((diff(col)>threshold_1)&&(difference<=threshold_2))?1:0;

vwd_diff3(col)=(diff(col)>threshold_3)?1:0;

vwd_diff4(col)=(diff up(col)>threshold_4)?1:0;

vwd_min(col)=(curr_line_buf(col)==0)?1:0; and vwd_max(col)=(curr_line_buf(col)==255)?1:0;

where the thresholds are programmable. Example default values as shown below may be used:

threshold_0=0;
threshold_1=1;
threshold_2=2;
threshold_3=128; and
threshold_4=128.

Using these thresholds: the metric vwd_diff0 indicates if the diff value shows no difference; the metric vwd_diff1 indicates if the diff value shows a difference of one; the metric vwd_diff2 indicates if the diff value shows a difference of 2; the metric vwd_diff3 indicates if the diff value shows a difference greater than 128; the metric vwd_diff4 indicates if the vertical diff value shows a difference greater than 128; the metric vwd_min indicates if the pixel appears to represent the color black; and the metric vwd_max indicates if the pixel appears to represent the color white.

These threshold values assume the color or luminance will be identified with the full bit range from 0 to 255. In some color schemes, the entire range is not used to represent a color. For example, a color component such as Y, CR, CB, R, G or B may only range from 16 to 240 or 16 to 250. In such schemes, vwd_min and vwd_max must be appropriately adjusted. For example:

vwd_min (col)=(curr_line_buf(col) <16)?1:0.

The seven one-bit vwd metrics shown above may be saved into a single eight-bit byte. The current line buffer location, if not otherwise needed, may be reused to hold the bit-sized vwd metrics calculated above. For example:

curr_line_buf(col)={1' b0, vwd_max, vwd_min, vwd_diff4, vwd_diff3, vwd_diff2, vwd_diff1, vwd_diff0)}.

By packing the vwd results into a single byte then storing that byte into the current line buffer, an additional line buffer is not necessary.

In step 617, an auto-correlation function may be used to search for JPEG/MPEG artifacts. A highly compressed MPEG sequence results in a heavily quantized JPEG/MPEG video image that shows blocking artifacts with an 8-pixel period. These blocking artifacts may imitate graphics images. Some embodiments of the present invention implement this additional metric to identify JPEG/MPEG blocking, so that a JPEG/MPEG video is not erroneously characterized as a graphics region, and thus the video would not be properly enhanced. The auto correlation function is defined as:

$$G(k) = \sum_{i=0}^{n-1-k} diff(i) * diff(i+k)$$

where n is the number of pixels along a row

Figure 22A:
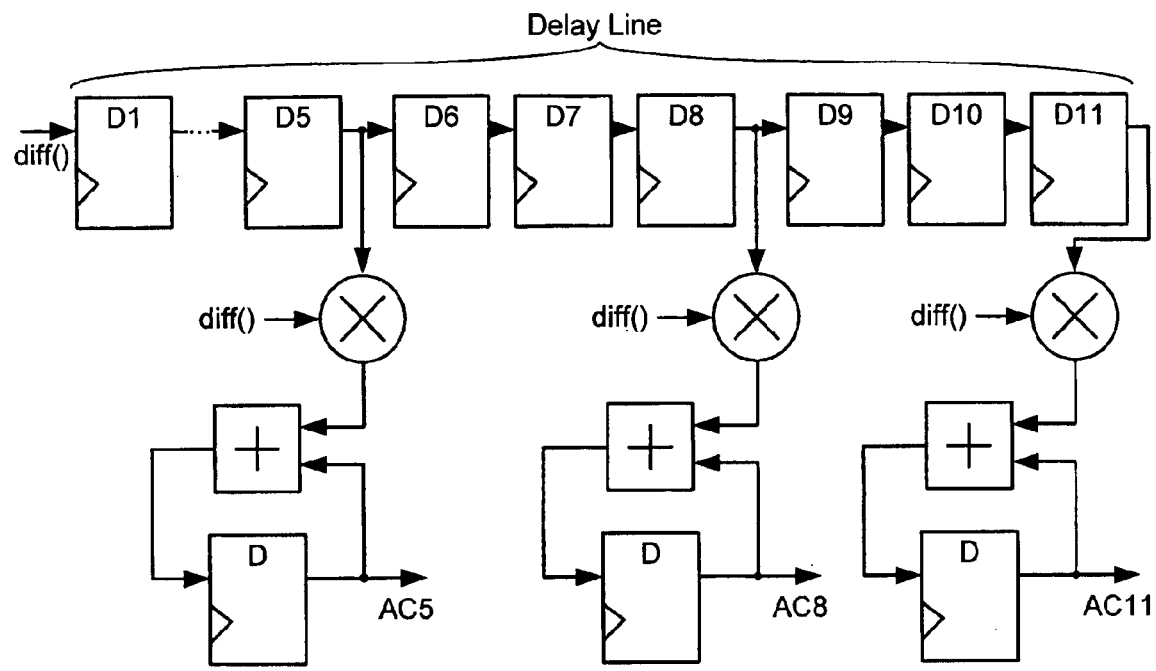
FIG. 22A illustrates an auto correlation function with three taps in accordance with the present invention.

FIG. 22A illustrates an auto correlation function with an exemplary three tap, length eleven delay line. In some embodiments, the pixel differences diff(col) calculated above are feed into an auto correlation delay lane into delay element D1 as shown. As successive difference values are clocked into the delay line, values shift from D1 to D2 on through D11. Delay taps are taken at 5, 8 and 11 delay points. Each delay tap is multiplied by the un-delayed pixel difference diff(col). Each product is delayed and a running sum is performed. Each auto correlation delay-product-sum chain results in a value, namely AC5, AC8 and AC11. The middle auto correlation result AC8 represents to what extent that pixels are grouped in blocks of eight. AC8 is compared to the outside auto correlation results AC5 and AC11. If AC8 is greater than the average of AC5 and AC8 then JPEG/MPEG video may be present. If a graphics line segment shows blocking artifact, such as those present in compressed video images, the graphics line segment may have been falsely categorized as a graphics line segment when actually a video line segment exists.

Figure 22B:
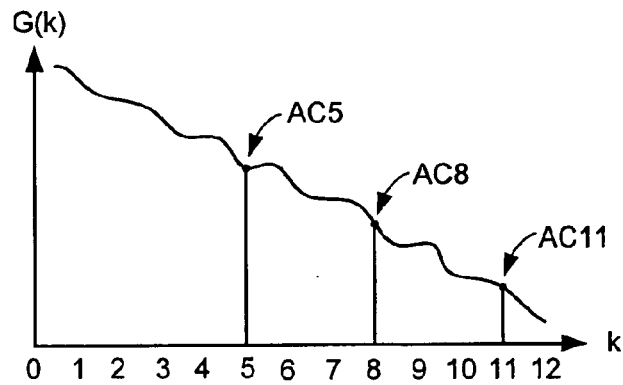
Figure 22B:
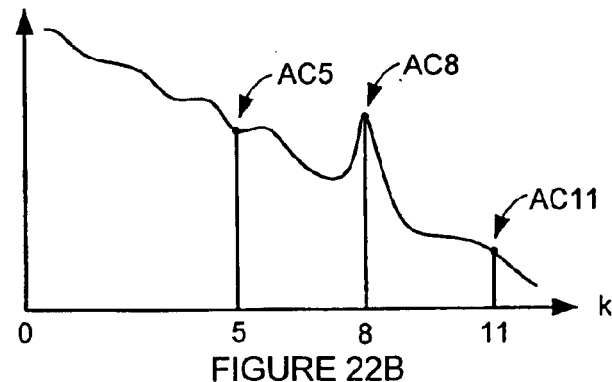

FIGS. 22B and 22C plot results from two different auto correlation cases. FIG. 22B shows an example where no significant JPEG/MPEG blocking artifact is present. Each of the three resulting vales AC5, AC8 and AC11 fall generally on a line. In other words, the average of AC5 and AC11 is approximately equal to AC8. FIG. 22C shows evidence of relatively high auto correlation value AC8 at 8 delays. AC5, AC8 and AC11 no longer fall generally on a line. AC8 is significantly greater than the average of AC5 and AC11. The peak at 8 delays represent blocking artifacts with a width of 8 bits, which is inherent in highly compressed JPEG/MPEG video. If blocking artifacts of width of 8 bits are shown to exist, a JPEG/MPEG metric is set. Otherwise the metric is cleared.

Instead of being applied across the entire row, as in the example above, the JPEG/MPEG metric could be calculated for only those portions of moving-line segments that are apparently classified as graphics from other considerations. In effect, regions already classified as video would not be tested. Only regions classified as graphics would undergo the auto correlation testing in an attempt to correct misclassification by reclassifying them as highly compressed video line segments. If the auto correlation is to be applied only to the graphics line segments, then steps 617 and 618 are interchanged.

Finally, in step 618 of FIG. 21, results from the spatial metrics and auto-correlation steps are used to find graphics line segments. As described in step 605 of FIG. 20, the find graphics line segments utilizes the metrics to determine where each sequence or grouping of graphics pixels exist to form a graphics line segment.

Figure 23:
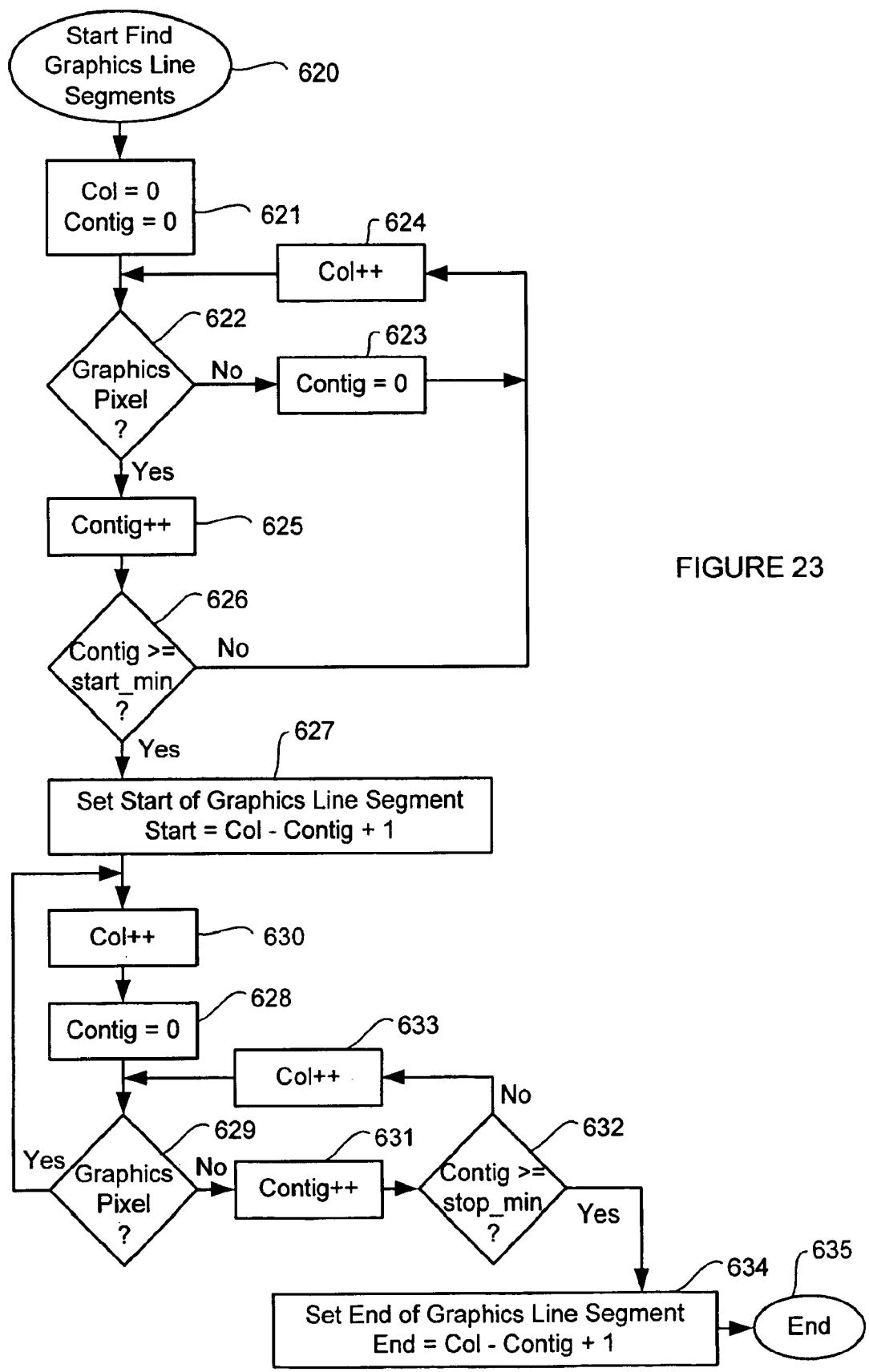
FIG. 23 is a detailed flow chart of a method to find graphics line segments in accordance with the present invention.

FIG. 23 is a detailed flow chart of a method to find graphics line segments. Some embodiments of the present invention implement a find graphics segments step of FIGS. 20 and 21 as follows. The method is comparable to the find moving line segments method described earlier with reference to FIG. 18. Step 621 initializes a column counter and a contiguous counter. The column counter (col) is an index used to step through the difference values (diff( ) or final_diff( )). The contiguous counter is used to count the number of contiguous motion or graphics pixels that exist in a sequence.

Next in step 622, the vwd metric bits are compared to thresholds to determine whether a pixel may be categorized as a graphics pixel. For example:

pixel_is_graphics (col)=
vwd_diff0(col)&&
vwd_diff1(col)&&
vwd_diff2(col)&&
vwd_diff4(col)&&
vwd_min(col)&&
vwd_max(col).

In words, a pixel is categorized as graphics if the difference between neighboring pixels is very low or very great indicating constant color or a sharp color change, respectively. Additionally, if the color of the pixel is extreme (i.e., black or white) then the pixel is more likely a graphics pixel.

Alternatively, an array of enable/disable bits (e.g., vwd_pixel_en) may be used to disable parts of the calculation. When a video signal is noisy, an operator may desire to disable some of the difference bins used in the calculation. For instance, when a manufacturer designs and manufactures an enhanced display processor for a system expected to receive and process noisy signals, the enable/disable bits may be set at the factory. The example above may be supplemented with an enable mask (vwd_pixel en) to create a flexible system to enable and disable testing criteria. For example:

pixel_is_graphics (col)=
(vwd_pixel_en[0]& vwd_diff0(col))&&
(vwd_pixel_en[1]& vwd_diff1(col))&&
(vwd_pixel_en[2]& vwd_diff2(col))&&
(vwd_pixel_en[3]& vwd_diff4(col))&&
(vwd_pixel_en[4]& vwd_min(col))&&
(vwd_pixel_en[5]& vwd_max(col));
where vwd_pixel_en is initially set to 0×FFh to enable each vwd metric.

In step 623, if the pixel is not a graphics pixel, the contiguous counter is reset, the column counter is incremented in step 624, then the next difference is similarly tested in step 622. If the pixel is a graphics pixel, the contiguous counter is incremented in step 625, then checked in step 626 to determine whether a sufficient number of graphics pixels have been detected contiguously. If an insufficient number of graphics pixels exist contiguously, step 624 increments the column counter and the next pixel is tested in step 622. If a sufficient number of graphics pixels exist contiguously, step 627 sets a start of a graphics line segment at the beginning of the contiguous series of pixels, then step 630 increments the column index. Step 628 resets the contiguous counter in order to count the number of contiguous non-graphics pixels.

Next in step 629, the pixel_is_graphics valve is calculated for the current column as described with reference to step 622 above to determine whether a pixel is categorized as a graphics pixel. If the pixel is a graphics pixel, the column counter is reset in step 630 and the contiguous counter is reset in step 628, then in step 629 the next difference is similarly tested. If the pixel is not a graphics pixel, the contiguous counter is incremented in step 631 and is, checked to determine whether a sufficient number of non-graphics/motion pixels has been detected contiguously in step 632. In step 632, if an insufficient number of non-graphics pixels exists contiguously, the column counter is incremented in step 633 and the next pixel is tested in step 629.

If a sufficient number of non-graphics pixels exist contiguously 632, an end of a graphics line segment is set at the point before the contiguous series of non-graphics pixels in step 634. If the end of the column is reached before the end is detected, steps 634 sets the end of the graphics line segment to the end of the row. Once an end is detected in step 635, the process ends at step 635 where the process repeats to find the next graphics line segment. To find the next graphics line segment, the process increments the column index and begin with step 622 again.

After sampled pixels of a row have been temporally and spatially processed according to embodiments of the present invention discussed above, separate bins of data exist. First, temporal calculation and analysis produced a set of moving line segments. Second, spatial calculation and analysis produced a set of graphics line segments and a set of spatial vwd metrics, which include seven separate one-bit metrics for each pixel location. These bins of data from temporal and spatial calculation and analysis are used to determine a set of video line segments. The video line segments will then be used to determine video boundaries. The video boundaries will then be used to enhance selected portions of the computer display presented to the operator.

Again, by determining a set of video line segments, an enhanced display processors 20 can set boundaries (borders) to indicate which pixels to enhance for proper video presentation. The video line segments may be compiled over time to produce a free-formed shape, or a polygon. The polygon may be a right-angled polygon such as one of the exposed video windows 2 shown in FIG. 5, or simply a polygon with straight edges and one or more non-right angled corners.

Each moving line segment found during temporal analysis is initially used to define a preliminary video line segment. That is, for each moving line segment, a video line segment is defined with the same start and end points as the moving line segment. In some embodiments, the preliminary video line segments are further refined using data from the spatial analysis. If a portion of a preliminary video line segment overlaps with part of a graphics line segment, additional statistics described below are compiled to determine whether the overlapping portion should remain part of the video line segment. If it is determined that it is more likely that the segment is graphics rather than video, the start and end points of the video line segment are adjusted to exclude the overlapping portions.

FIGS. 24A–24D show various combinations of overlapping motion and graphics line segments plotted along a frame row. As mentioned, temporal calculation and analysis results in a set of moving line segments, and spatial calculation and analysis results in a set of graphics line segments. Each of the figures shows a moving line segment from X1 to X4 where one or two graphics line segments overlap with the moving line segment. The portion of a moving line segment that is not overlapped by a graphics line segment is categorized as a video line segment. In some embodiments, graphics line segments in non-moving regions and regions that have neither graphics nor moving line segments are not further analyzed.

Figure 24A:
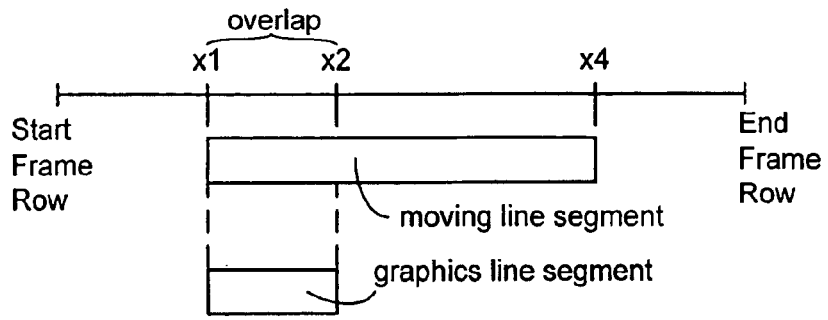
FIGS. 24A–24D illustrate various combinations of moving line segments and graphics line segments in a frame line in accordance with the present invention.

FIG. 24A shows a moving line segment from X1 to X4 and a graphics line segment from X1 to X2. The overlapping region runs from X1 to X2. Therefore, the video line segment runs from X2 to X4.

Figure 24B:
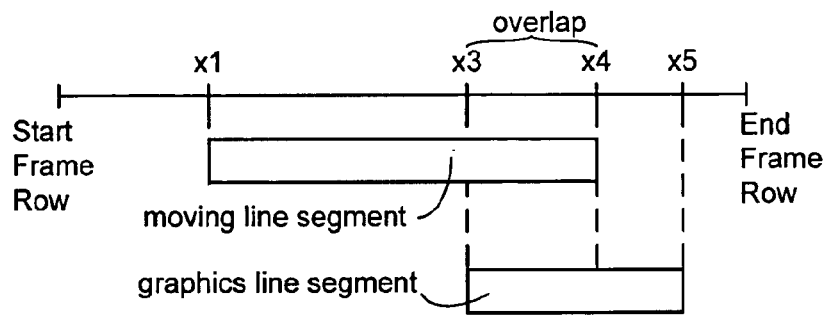

FIG. 24B shows a moving line segment from X1 to X4 and a graphics line segment from X3 to X5. The overlapping regions runs from X3 to X4. Therefore, the video line segment runs from X1 to X3.

Figure 24C:
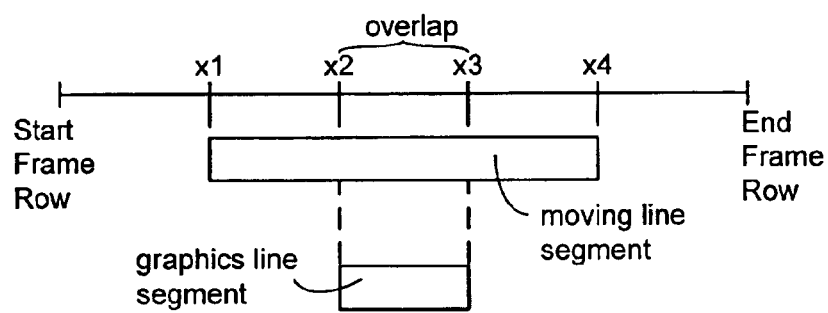

FIG. 24C shows a moving line segment from X1 to X4 and a graphics line segment from X2 to X3. The overlapping region runs from X2 to X3 splitting the video line segment. Therefore, two video line segments exists: one runs run from X1 to X2 and one runs from X3 to X4.

Figure 24D:
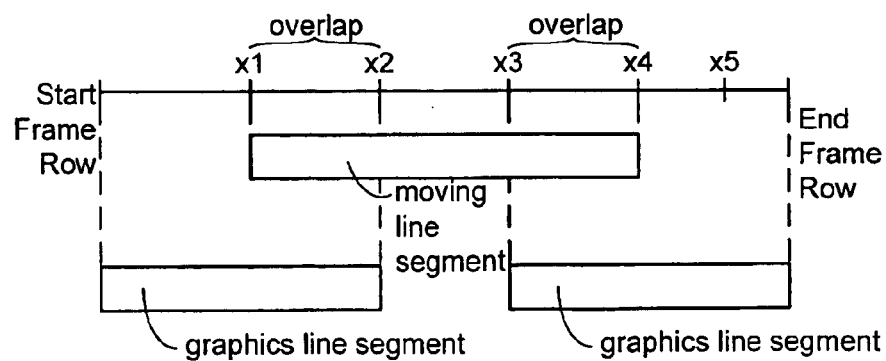

FIG. 24D shows a moving line segment from X1 to X4, a graphics line segment from 0 to X2, and a second graphics line segment from X3 to the end. The overlapping regions run from X1 to X2 and from X3 to X4. Therefore, the video line segment runs from X2 to X3.

To determine whether an overlapping portion of a preliminary video line segment should remain a video line segment, additional statistics are calculated for those locations within the overlapping regions.

Number of differences of zero:

$$vwd\_ndiff0 = \sum_{col=start}^{end} vwd\_diff0(col);$$

Number of differences of one:

$$vwd\_ndiff1 = \sum_{col=start}^{end} vwd\_diff1(col);$$

Number of differences of two:

$$vwd\_ndiff2 = \sum_{col=start}^{end} vwd\_diff2(col);$$

Number of differences greater than 128:

$$vwd\_ndiff28 = \sum_{col=start}^{end} vwd\_diff3(col);$$

Number of vertical (up) differences greater than 128:

$$vwd\_ndiffv = \sum_{col=start}^{end} vwd\_diff4(col);$$

Number of black pixels:

$$vwd\_nmin = \sum_{col=start}^{end} vwd\_min(col); \text{ and}$$

Number of white pixels:

$$vwd\_nmax = \sum_{col=start}^{end} vwd\_max(col);$$

where start is starting position of overlapping segment, end is the ending position of overlapping segment, and the total number of bits summed is ntotal=(end-start+1).

Finally, the determination of whether the preliminary video line segment should remain a video line segment may be made using:

segment_is_graphics=
(vwd_ndiff0>vwd_ndiff1*vwd_ratio_0_1/2)&&
(vwd_ndiff0>vwd_ndiff2*vwd_ratio_0_2/2)&&
(vwd_ndiff128*vwd_percent_128>ntotal)&&
(vwd_ndiffv>=vwd_percent_v*ntotal/16)&&
(vwd_nmin>=vwd_percent_min*ntotal/16)&&
(vwd_nmax>=vwd_percent_max*ntotal/16).

Note that each comparison includes a separate programmable threshold. One embodiment uses the following default values as the threshold:

vwd_ratio_0_1=2;
vwd_ratio_0_2=4;
vwd_percent_128=¼;
vwd_percent_v=¼;
vwd_percent_min=¼; and
vwd_percent_max=¼.

Using these thresholds: the term (vwd_ndiff0>vwd_ndiff1*vwd_ratio_0_1/2) compares the number of points in a segment that show no differences to twice the number of points in a segment that show a difference value of one; the term (vwd_ndiff0>vwd_ndiff2* vwd_ratio_0_2/2) compares the number of points in a segment that show no differences to twice the number of points in a segment that show a difference value of two; the term (vwd_ndiff128* vwd_percent_128>ntotal) compares the number of points in a segment that show a difference of greater than 128 divided by 4 to the number of points in a segment; the term (vwd_ndiffv >=vwd_percent_v*ntotal/16) compares the number of points in a segment that show a vertical difference of greater than 128 to the number of points in a segment divided by 64; the term (vwd_nmin>=vwd_percent_min*ntotal/16) compares the number of black points in a segment to the number of points in a segment divided by 64; and the term (vwd_nmax>=vwd_percent_max*ntotal/16) compares the number of white points in a segment to the number of points in a segment divided by 64. Each of these terms if true, indicates that a segment is not a video segment but rather a graphics segment.

Alternatively, an array of enable/disable bits (e.g., vwd_segment_en) may be used to disable parts of the calculation. When a video signal is noisy, an operator may desire to disable some of the difference bins used in the calculation. For instance, when a manufacturer designs and manufactures an enhanced display processor for a system expected to receive and process noisy signals, the enable/disable bits may be set at the factory. The example above may be supplemented with an enable mask (vwd_segment_en) to create a flexible system to enable and disable testing criteria. For example:

segment_is_graphics=
vwd_segment_en[0]& (vwd_ndiff0>vwd_ndiff1*vwd_ratio_0_1/2)&&
vwd_segment_en[1]& (vwd_ndiff0>vwd_ndiff2*vwd_ratio_0_2/2)&&
vwd_segment_en[2]& (vwd_ndiff128*vwd_percent_128>ntotal)&&
vwd_segment_en[3]& (vwd_ndiffv>=vwd_percent_v*ntotal/16)&&
vwd_segment_en[4]& (vwd_nmin>=vwd_percent_min*ntotal/16)&&
vwd_segment_en[5]& (vwd_nmax>=vwd_percent_max*ntotal/16).

As described above, the results from temporal calculation and analysis and spatial calculation and analysis provide a set of moving line segments and graphics line segments. The results are used to define a set of video line segments. Next, the video line segments can be compared with one another to define a set of exposed video windows.

After a set of video line segments are determined from a pair of frames, the results are combined with past results from previous pairs of frames to track the locations of exposed video windows. The exposed video windows are used by the video image processor 900 (FIG. 9A) to determine whether a pixel within the input stream of pixel data should be enhanced or passed without enhancement.

Figure 25:
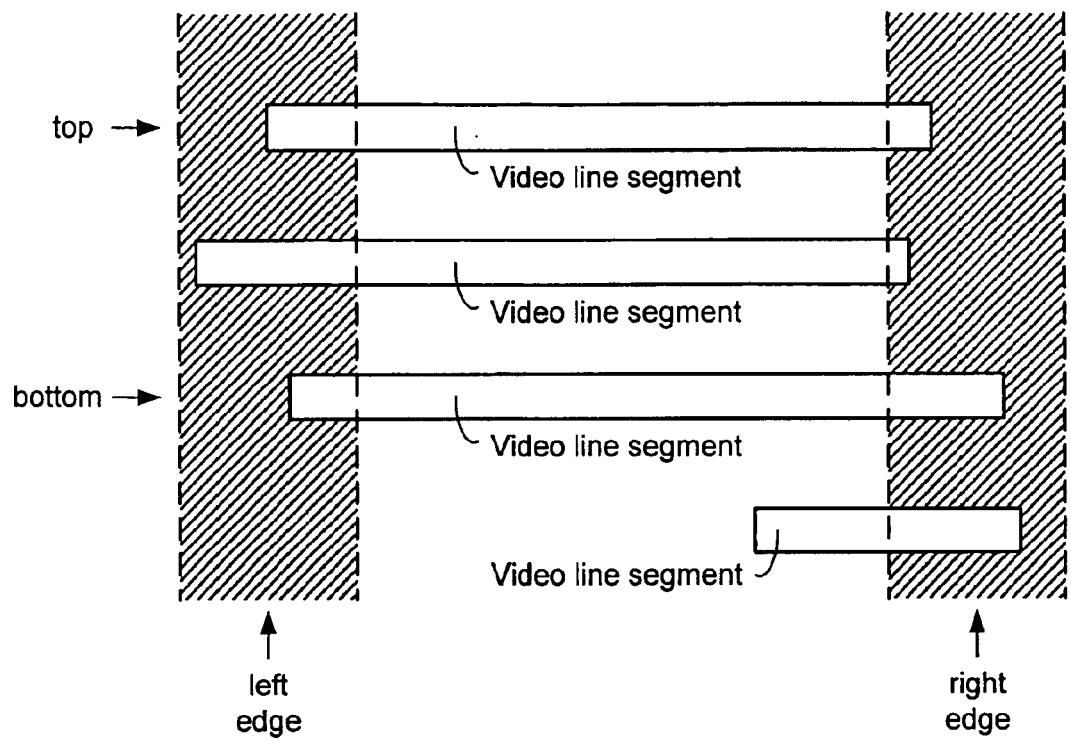
FIG. 25 illustrates a number of detected video line segments within a frame in accordance with the present invention.

FIG. 25 illustrates a number of detected video line segments within a frame. If forming a free-formed exposed video window, an curve fitting algorithm may be used to connect end points of the video line segments. If forming a polygon shaped exposed window, the boundaries of the exposed window may be formed by connecting the end points of a group of relatively close video line segments. If forming a right-angled polygon, the left and right vertical edges of a detected video window are approximately set by the left and right ends of the video line segments.

In some embodiments, the top and bottom of the detected video window are determined by looking for new video line segments in the neighboring stripes above and below the stripes containing the farthest vertical limits of a previous detected exposed video window. For the start and end of a video line segment to be associated with the right or left edge of a previously detected video widow, the end will lie within a fixed horizontal distance from the outermost horizontal limits of a previously detected window. The tolerance bandwidth may be permanently fixed, factory set or operator defined. The width of the tolerance band dictates the maximum amount of allowed skew among video lines of the same detected video window edge. If a stripe contains a video line segment having a start or end within the tolerance band, the vertical boundaries of the detected video window are increased to include that video line segment.

The process of examining stripes is repeated with each new frame pair to define the top and bottom of a detected video window. The process is complete for a stationary window once the stripes above and below the detected video show no video line segments within the tolerance band.

In some embodiments, the left and right edges of the detected video window are defined by the farthest reaching video line segments. For example, a left edge of the detected video window might be defined by the left end of the left most video line segment. The right edges could be similarly determined: In other embodiments, the left and right edges of the detected video window are defined by averaging the ends or by taking the median value.

The first set of detected video line segments allows a first estimate of the location of a set of exposed video windows. Subsequent frame pairs, when analyzed, may adjust the boundaries of exposed video windows as a result of either the windows are moving or the frame has yet to be completely analyzed. Initially, the estimated boundaries change to more precisely locate an exposed video window. Eventually, after the boundaries of the exposed video windows become stable, the boundaries might change to track changes in the position of a moving video window, e.g., a video window moved by an operator using a mouse of the computer system. The position of a displayed video window may change if an operator moves or resizes a video window or if he moves or resizes a graphics window that partially overlays a video window. The estimate of the location of the edges of an video window adjusts dynamically as subsequent frame pairs are analyzed.

Figure 26:
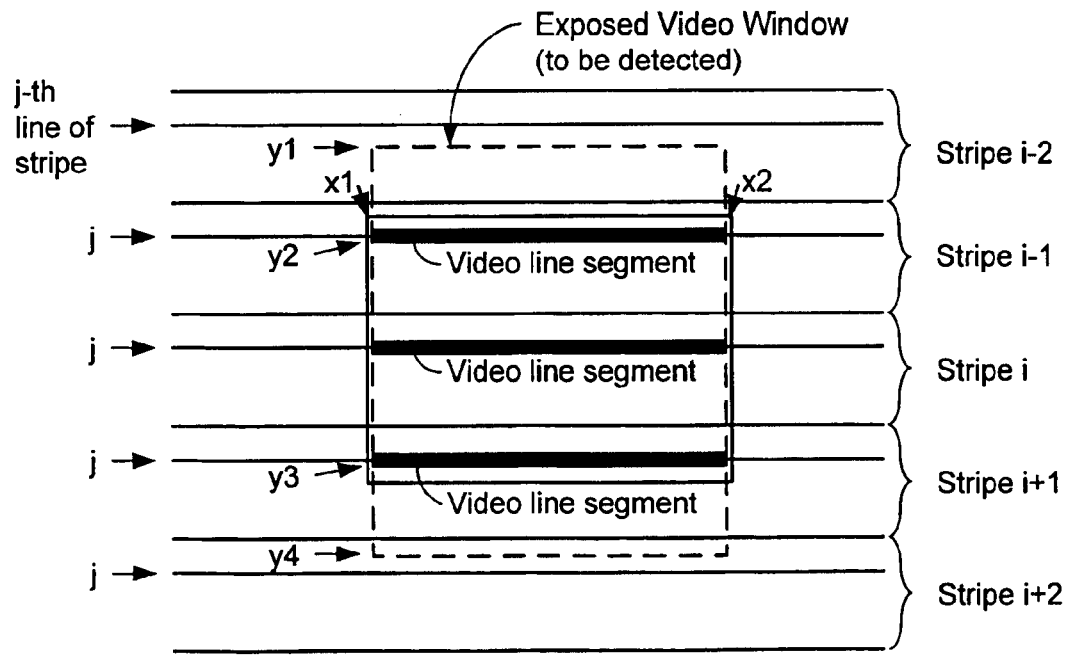
FIG. 26 shows the initial boundaries for a newly introduced video window in accordance with the present invention.

FIG. 26 shows the initial boundaries for a newly introduced video window. The exposed video window has a set of diagonal corners at point X1, Y1 and X2, Y4. The exposed video window spans four stripes, however, the first pair of frames analyzed initially sets the boundaries of the exposed video window such that it only spans three stripes. The initial approximated boundaries conservatively set the exposed window to a set of diagonal corners at point X1, Y2 and X2, Y3. Vertical coordinates Y2 and Y3 each correspond to the j-th row of a stripe. As time progresses with the analysis of subsequent frame pairs, the bottom boundary will incrementally increase until the row corresponding to Y4 is analyzed. The top boundary will stay fixed until the row corresponding to the Y1 is analyzed in the upper stripe. Once each row has been analyzed, which will occur over a series of frame pairs, the boundaries of the estimated exposed video window will correspond to the actual video window displayed to the operator.

When determining whether to enlarge the estimate exposed video window, the start and end points of the video line segments are compared to the left and right boundaries of the most recently detected video window. If pixels just outside the left or right edge of the estimated boundaries of the exposed video window are identified as video pixels, that boundary of the exposed video window is expanded to include those pixels. In this manner, as successive rows of a stripe are analyzed, the vertical edges expand left and right.

The top and bottom boundaries of an exposed video window may contract. If the exposed video window includes a row that does not include a video line segment, the boundary of the exposed video window is adjusted inward so as to not include that non-video line segment. In this manner, the horizontal edges contract up or down to reduce the area of the estimated exposed video window.

Similarly, the left and right boundaries expand and contract in row with the detected video windows. The changes may either be immediate as describe above or may be smoothed by a sliding window averaging filter or another low pass filter.

Figure 27:
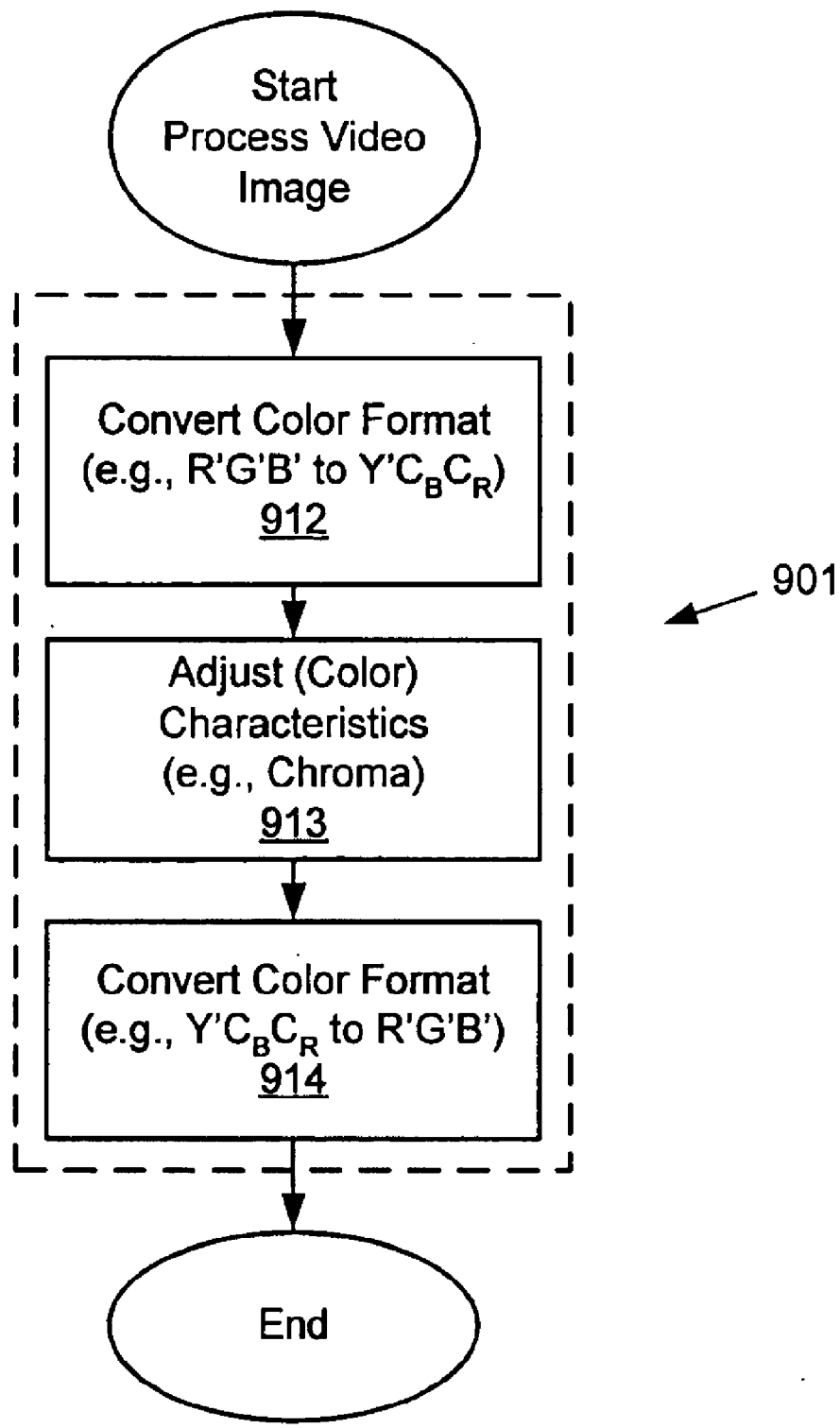
FIG. 27 illustrates a process video step.

FIG. 27 illustrates a process video step 901 of FIG. 3 that would occur after boundaries of an exposed video window are determined. In some embodiments, a video image processing step 901 includes a convert color format step 912. Step 912 may convert an input stream of pixel data identified as video data from a standard color format to a color format requiring less computational processing to adjust. For example, one step 912 converts an input stream of pixel data that is in the R'G'B' format to a stream of Y' CBCR color format data. If the stream of pixel data that has been identified as a video image is already in a computationally less intensive color format, step 912 may be skipped.

An "adjust" step 913 adjusts characteristics of the input data to enhance an identified video window. Characteristics that may be adjusted include, for example, brightness, contrast, color saturation, hue, gamma, chroma and color temperature. A "convert color format" step 914 converts the pixel data stream a second time. For example, step 904 may convert the Y' CBCR color format data back to the R'G'B' format compatible to the computer display.

In some embodiments, steps 913 and 914 are combined into a single integrated step. For example, steps 913 and 914 may be combined by using a color look-up table (CLUT) transfer function that performs both an adjustment and a conversion simultaneously, thus providing programmable transfer function capability. In some embodiments, the CLUT is implemented in a triple 256-element 8-bit RAM. The RAM can contain an initial set of default values that the video image processor 900 can later overwrite and update.

The above detailed descriptions are provided to illustrate specific embodiments of the present invention and are not intended to be limiting. Numerous modifications and variations within the scope of the present invention are possible.

The present invention is defined by the appended claims.

We claim:

1. A method of automatically detecting video pixels within a stream of pixel data, the method comprising:

selecting a first partial set of pixel positions from and fewer than a full set of pixel positions of a frame template;

sampling pixel data for each pixel position of the first partial set of pixel positions from a first frame in the stream of pixel data, thereby defining a first set of pixel data;

saving the first set of pixel data;

sampling corresponding pixel data for each pixel position of the first partial set of pixel positions from a second frame within the stream of pixel data, thereby defining a second set of pixel data; and calculating a temporal difference value between each pixel data of the first set of pixel data and the corresponding pixel data of the second set of pixel data, thereby defining a first set of difference values between the first frame and the second frame.

2. The method of claim 1, wherein the method repeats over a series of frames greater than two frames and wherein each occurrence of the step of selecting the first partial set of pixel positions further comprises selecting a non-intersecting set of pixel positions, the method repeating after each pixel position of the frame template is selected an equal number of times.

3. The method of claim 2, wherein subsequent occurrences of the step of selecting the first partial set of pixel positions further comprises:

selecting a reference pixel location; and selecting additional pixel locations based on a relative position to the reference pixel location;

wherein the reference pixel location of a current step of selecting the first partial set of pixel positions is based on a previous reference pixel location selected during an immediately preceding step of selecting the first partial set of pixel positions.

4. The method of claim 3, wherein each pixel position of the frame template is indexed by a row value and a column value, and wherein the reference pixel location of the current step is set to a pixel location set to a fixed row distance and a fixed column distance from the previous reference pixel location.

5. The method of claim 1, wherein the method further comprises comparing each temporal difference value from the first set of difference values to a first threshold and a second threshold defining a first subrange of differences, and if the temporal difference value is within the first subrange of differences, setting a motion indicator to indicate an in-motion pixel value, otherwise setting the motion indicator to indicate a not-in-motion pixel value, thereby setting a plurality of motion indicators.

6. The method of claim 5, wherein the step of selecting the first partial set of pixel positions includes:

dividing the frame template into a plurality of stripes across the frame template, wherein each of the plurality of stripes contains an integer number of rows greater than two;

selecting a representative row from each of the plurality of stripes; and selecting from the representative row a plurality of representative pixel positions, wherein the plurality of representative pixel positions includes only a partial set of pixel positions contained in the representative row, and wherein a compilation of the plurality of representative pixel positions of the representative row from each of the plurality of stripes defines the first partial set of pixel positions.

7. The method of claim 6, wherein the method further comprises:

forming one or more moving line segments such that each of the moving line segments include a group of motion indicators contained along the representative row such that at least a majority of the group of motion indicators indicate the in-motion pixel value.

8. The method of claim 7, wherein the method further comprises determining borders of an exposed video window encompassing the video pixels defined by the one or more moving line segments.

9. The method of claim 8, wherein the borders are polygonal.

10. The method of claim 9, wherein the borders have all right angle coners.

11. The method of claim 8, wherein the step of determining the borders of the exposed video window comprises:

comparing one or more right ends of the one or more moving line segments to determine one or more right edges of the exposed video window; and comparing one or more left ends of the one or more moving line segments to determine one or more left edges of the exposed video window;

examining one or more top moving line segments of the one or more moving line segments to identifying one or more top edges of the exposed video window;

examining one or more bottom moving line segments of the one or more moving line segments to identifying one or more bottom edges of the exposed video window; and connecting the one or more right, left, top and bottom edges define either a non-rectangular exposed video window or multiple exposed video windows.

12. The method of claim 1, wherein the method further comprises:

determining a second partial set of pixel positions from and fewer than the full set of pixel positions of the frame template, wherein the second partial set of pixel positions includes a plurality of center pixel positions corresponding to the first partial set of pixel positions and a corresponding one or more neighboring pixel positions each located adjacent to one of the plurality of center pixel positions;

sampling center pixel data for each pixel position of the plurality of center pixel positions from a third frame in the stream of pixel data, thereby defining a third set of pixel data;

sampling a corresponding one or more neighboring pixel data for each pixel position of the one or more neighboring pixel positions from the third frame within the stream of pixel data, thereby defining a fourth set of pixel data; and calculating for each center pixel data, a set of spatial difference values, wherein the set of spatial difference values includes one difference value between the center pixel data and each of the corresponding one or more neighboring pixel data, thereby defining a second set of difference values between the center pixel data and the one or more neighboring pixel data.

13. The method of claim 12, wherein the third frame is the second frame.

14. The method of claim 12, wherein the method further comprises comparing each of the set of spatial difference values from the second set of differences to a third threshold and a fourth threshold defining a second subrange of differences, and if any of the set of spatial difference values for the center pixel data is outside the second subrange of difference, setting a graphics indicator to indicate a graphics pixel value for the center pixel position, otherwise setting the graphics indicator to indicate a not-graphics pixel value for the center pixel position, thereby setting a plurality of graphics indicators.

15. The method of claim 14, wherein the method further comprises forming one or more graphics line segments such that each of the graphics line segments include a group of graphics indicators contained along the representative row such that at least a majority of the group of graphics indicators indicate the graphics pixel value.

16. The method of claim 7, wherein the method further comprises:
  determining a second partial set of pixel positions from and fewer than the full set of pixel positions of the frame template, wherein the second partial set of pixel positions includes a plurality of center pixel positions corresponding to the first partial set of pixel positions and a corresponding one or more neighboring pixel positions each located adjacent to one of the plurality of center pixel positions;
  sampling center pixel data for each pixel position of the plurality of center pixel positions from a said frame in the stream of pixel data, thereby defining a third set of pixel data;
  sampling a corresponding one or more neighboring pixel data for each pixel position of the one or more neighboring pixel positions from the same said frame within the stream of pixel data, thereby defining a fourth set of pixel data; and
  calculating for each center pixel data, a set of spatial difference values, wherein the set of spatial difference values includes one difference value between the center pixel data and each of the corresponding one or more neighboring pixel data, thereby defining a second set of difference values between the center pixel data and the one or more neighboring pixel data.

17. The method of claim 16, wherein the method further comprises:
  comparing each of the set of spatial difference values from the second set of differences to a third threshold and a fourth threshold defining a second subrange of differences, and if any of the set of spatial difference values for the center pixel data is outside the second subrange of differences, setting a graphics indicator to indicate a graphics pixel value for the center pixel position, otherwise setting the graphics indicator to indicate a not-graphics pixel value, thereby setting a plurality of graphics indicators; and
  forming one or more graphics line segments such that each of the graphics line segments includes a group of graphics indicators contained along the representative row such that at least a majority of the group of graphics indicators indicate the graphics pixel value.

18. The method of claim 17, wherein the method further comprises defining as a video line segment each segment of each of the one or more moving line segments that do not overlap with one of the one or more graphics line segments.

19. The method of claim 18, wherein the method further comprises:
  performing an auto correlation function to detect where in each of the one or more graphics line segments a blocking artifact exists wherein the blocking artifact exists due to a compressing of a video image; and
  defining an additional video line segment for each segment exhibiting the blocking artifact.

20. The method of claim 18, wherein the method further comprises:
  determining the borders of an exposed video window using the video line segments such that the borders enclose the video line segments.

21. The method of claim 20, wherein the step of determining the borders the exposed video window comprises:
  comparing one or more right ends of the one or more video line segments to determine one or more right edges of the exposed video window; and
  comparing one or more left ends of the one or more video line segments to determine one or more left edges of the exposed video window;
  examining one or more top moving line segments of the one or more video line segments to identifying one or more top edges of the exposed video window; and
  examining one or more bottom moving line segments of the one or more video line segments to identifying one or more bottom edges of the exposed video window;
  whereby the one or more right, left, top and bottom edges define the exposed video window.

22. An apparatus for automatically detecting video pixels within a stream of pixel data, the apparatus comprising:
  a means for selecting a first partial set of pixel positions from and fewer than a full set of pixel positions of a frame template;
  a means for sampling pixel data for each pixel position of the first partial set of pixel positions from a first frame in the stream of pixel data, thereby defining a first set of pixel data, and for sampling corresponding pixel data for each pixel position of the first partial set of pixel positions from a second frame within the stream of pixel data, thereby defining a second set of pixel data;
  a memory for saving the first set of pixel data; and
  a processor programmed to calculate a temporal difference value between each of the pixel data of the first set of pixel data and the corresponding pixel data of the second set of pixel data, thereby defining a first set of differences.

23. The apparatus of claim 22, wherein the apparatus further comprises:
  a means for comparing each of the temporal difference values;
  a means for forming one or more moving line segments; and
  a means for determining borders of the exposed video window using the one or more moving line segments.

24. An apparatus for automatically detecting video pixels within a stream of pixel data, the apparatus comprising:
  a means for sampling a first set of pixel data for each pixel position of the partial set of pixel positions from a first frame in the stream of pixel data, wherein the partial set of pixel positions are selected from and fewer than a full set of pixel positions of a frame template;
  a means for sampling a second set of pixel data for each pixel position of the partial set of pixel positions from a second frame in the stream of pixel data;
  a means for sampling a third set of pixel data for a select set of pixel positions adjacent to each pixel position of the partial set of pixel positions from the first or second frames in the stream of pixel data;
  a temporal computation means for performing calculations between the first set of pixel data from the first frame and the second set of pixel data from the second frame;

a spatial computational means for performing calculations among the first or second sets of pixel data and the third set of pixel data;

a correlation means to generate one or more video line segments by correlating results from the temporal computation means and the spatial computational means;

a means for determine boundaries of an exposed video window encompassing the video pixels by using the results from the correlation means; and a means for modifying pixel data within the stream of pixel data for pixel data located within the boundaries of the exposed video window.

25. An semiconductor device for automatically detecting and modifying video pixels within a stream of pixel data, the semiconductor device comprising:

a memory;

a processor coupled to the memory;

an input coupled to the stream of pixel data and coupled to the processor;

a sampler circuit;

a program for execution on the processor, wherein the program controls the sampler circuit such that the sampler circuit samples only a partial set pixel data from frame to frame of fewer than all pixel data in the stream of pixel data, and wherein the program determines boundaries to encompass the video pixels, thereby defining an exposed video window based on the partial set of pixel data;

a pixel modifying unit to modify pixel data identified as falling within the boundaries of the exposed video window; and an output coupled to an output stream of pixel data and of the pixel modifying unit.

26. The semiconductor device of claim 25, wherein the output provides an output stream of pixel data formatted in a digital video interface standard.

27. The semiconductor device of claim 25, wherein the input accepts the stream of pixel data when formatted in a digital video interface standard.

28. A method for detecting video pixel data in a stream of pixel data arranged as sequential frames, with each said frame including a set of pixel positions to which the pixel data corresponds, the method comprising:

sampling the pixel data for only a subset of the pixel positions of a first said frame;

sampling the pixel data for a same subset of the pixel positions for a second said frame;

determining an amount of change in a value of the pixel data for each pixel position of the subset of pixel positions between the first and second sets of pixel data;

determining from the amount of the change in the value whether the pixel data for each pixel position of the subset is the video pixel data.

29. The method of claim 28, further comprising:

sampling the pixel data for only a subset of the pixel positions of one of said frames, thereby defining a third set of pixel data, said third set including pixel data corresponding to plural groups of neighboring pixel positions of the frame;

determining an amount of change in a value of the pixel data for at least some of the neighboring pixel positions of each group; and determining from the amount of change in the value whether the pixel data corresponding to at least one of the pixel positions of each said group is video pixel data or not video pixel data.

30. A method for detecting whether a pixel data in a stream of pixel data is a video pixel data or not a video pixel data, wherein each pixel data of the stream corresponds to one of plural pixel position of a fame, the method comprising:

sampling the pixel data corresponding to a first subset of the pixel positions of the frame, said first subset including plural pixel positions but fewer than all of said pixel positions of the frame;

sampling the pixel data corresponding to at least one pixel position neighboring each of the pixel positions of the first subset of the pixel positions;

determining a difference in a value between the sampled pixel data corresponding to each pixel position of the first subset and the respective neighboring pixels; and determining from said difference in the value whether the pixel data for each pixel position of the first subset is a said video pixel data or not a said video pixel data.

* * * * *

UNITED STATES PATENT AND TRADEMARK OFFICE
CERTIFICATE OF CORRECTION

PATENT NO. : 6,873,341 B1
DATED : March 29, 2005
INVENTOR(S) : Dale R. Adams et al.

It is certified that error appears in the above-identified patent and that said Letters Patent is hereby corrected as shown below:

Column 1,
Line 40, please note that there should not be a line break between the words "a" and "rectangular".

Column 5,
Line 53, please replace "defined" with -- define --.

Column 6,
Line 15, please replace "thought" with -- through --.
Line 15, please replace "overlaps" with -- overlap --.

Column 7,
Line 17, please replace "represented one" with -- represented by one --.
Line 38, please replace "frame" with -- frames --.
Line 43, please replace "processors" with -- processor --.

Column 10,
Line 8, please replace "detection Subsequent" with -- detection. Subsequent --.
Line 10, please replace "pixel s" with -- pixels --.
Line 12, please replace "of frame" with -- of a frame --.
Line 18, please replace "c enter" with -- center --.
Line 25, please replace "row is" with -- row j is --.
Line 30, please replace "com pared" with -- compared --.
Line 31, please replace "pixel s" with -- pixels --.

Column 12,
Line 49, please replace "pixels ," with -- pixels, --.

Column 14,
Line 16, please replace "14B" with -- 14E --.

Column 15,
Line 8, the phrase "In step 502," should begin a new paragraph.

Column 16,
Line 37, please replace "attenuates" with -- attenuate --.

Column 19,
Line 33, please replace "old_1 ))?1:0" with -- old_1))?1:0 --.
Lines 40 and 41, please replace "==" with -- = = --.

UNITED STATES PATENT AND TRADEMARK OFFICE
CERTIFICATE OF CORRECTION

PATENT NO.    : 6,873,341 B1
DATED         : March 29, 2005
INVENTOR(S)   : Dale R. Adams et al.

It is certified that error appears in the above-identified patent and that said Letters Patent is hereby corrected as shown below:

Column 20,
Line 28, please replace "row" with -- row. --.
Line 32, please replace "feed" with -- fed --.
Line 51, please replace "vales" with -- values --.

Column 22,
Line 8, please replace "is," with -- is --.
Line 18, please replace "steps" with -- step --.
Line 22, please replace "begin" with -- begins --.
Line 37, please replace "processors" with -- processor --.

Column 23,
Line 12, please replace "exists" with -- exist --.
Line 12, please replace "runs run from" with -- runs from --.
Line 44, please replace "vwd_ndiff28" with -- vwd_ndiffl28 --.

Column 25,
Lines 12 and 61, please replace "an" with -- a --.

Column 28,
Lines 25 and 28, please replace "identifying" with -- identify --.
Line 32, please replace "edges define" with -- edges to define --.

Column 29,
Line 23, please replace "from a said" with -- from said --.

Column 30,
Line 7, please replace "borders the" with -- borders of the --.
Lines 15 and 18, please replace "identifying" with -- identify --.

Column 31,
Line 7, please replace "determine" with -- determining --.
Line 13, please replace "An" with -- A --.
Line 24, please replace "set pixel" with -- set of pixel --.

UNITED STATES PATENT AND TRADEMARK OFFICE
CERTIFICATE OF CORRECTION

PATENT NO.   : 6,873,341 B1
DATED         : March 29, 2005
INVENTOR(S)  : Dale R. Adams et al.

It is certified that error appears in the above-identified patent and that said Letters Patent is hereby corrected as shown below:

Column 32,
Line 28, please replace "position of a fame" with -- positions of a frame --.
Lines 41 and 42, please replace "a said video" with -- a video --.

Signed and Sealed this

Sixteenth Day of August, 2005

JON W. DUDAS
*Director of the United States Patent and Trademark Office*